(12) United States Patent
Oyaizu et al.

(10) Patent No.: US 12,028,625 B2
(45) Date of Patent: Jul. 2, 2024

(54) IMAGING DEVICE MANUFACTURING APPARATUS, METHOD FOR MANUFACTURING IMAGING DEVICE, AND IMAGING DEVICE

(71) Applicant: SONY GROUP CORPORATION, Tokyo (JP)

(72) Inventors: Hideki Oyaizu, Tokyo (JP); Ilya Reshetouski, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/769,209

(22) PCT Filed: Nov. 19, 2020

(86) PCT No.: PCT/JP2020/043169
§ 371 (c)(1),
(2) Date: Apr. 14, 2022

(87) PCT Pub. No.: WO2021/111888
PCT Pub. Date: Jun. 10, 2021

(65) Prior Publication Data
US 2024/0121522 A1 Apr. 11, 2024

(30) Foreign Application Priority Data
Dec. 3, 2019 (JP) .................................. 2019-218883

(51) Int. Cl.
*H04N 23/955* (2023.01)
*G02B 3/00* (2006.01)
(Continued)

(52) U.S. Cl.
CPC ......... *H04N 23/955* (2023.01); *G02B 3/0012* (2013.01); *G02B 3/0043* (2013.01);
(Continued)

(58) Field of Classification Search
CPC .. H04N 23/955; H04N 23/957; G02B 3/0012; G02B 3/0043; G03B 17/24; G03B 2217/24
See application file for complete search history.

(56) References Cited

U.S. PATENT DOCUMENTS 8,530,989 B2 * 9/2013 Kikuchi ............ H01L 27/14623
257/435
10,914,639 B2 * 2/2021 Kester .................. H04N 25/671
(Continued)

FOREIGN PATENT DOCUMENTS

JP  2008-527944 A  7/2008
JP  2008-542863 A  11/2008
(Continued)

OTHER PUBLICATIONS

Boominathan et al., Lensless Imaging: A Computational Renaissance, IEEE Signal Processing Magazine, Sep. 2016, pp. 1-21, vol. 33, Issue 5, IEEE.
(Continued)

*Primary Examiner* — Hung H Lam
(74) *Attorney, Agent, or Firm* — Paratus Law Group, PLLC

(57) ABSTRACT

There is provided an imaging device manufacturing apparatus, a method for manufacturing an imaging device, and an imaging device that are designed to be capable of increasing the quality of an image to be reconstructed by a lensless camera. The lensless camera includes a mask that has a plurality of lenses that transmit and condense incident light in part of a light shielding material, and modulates and transmits the incident light; an imaging element that images the incident light modulated by the mask as a pixel signal; and a signal processing unit that reconstructs the pixel signal as a final image by signal processing, the optical axis directions of the lenses to be disposed in the mask are
(Continued)

adjusted so that only the incident light having passed through the mask is condensed and enters the imaging element. The present disclosure can be applied to lensless cameras.

20 Claims, 21 Drawing Sheets

(51) Int. Cl.
   *G03B 17/24* (2021.01)
   *H04N 23/957* (2023.01)
(52) U.S. Cl.
   CPC .......... *G03B 17/24* (2013.01); *H04N 23/957* (2023.01); *G03B 2217/24* (2013.01)

(56) References Cited

U.S. PATENT DOCUMENTS

| | | | |
|---|---|---|---|
| 2005/0030749 A1* | 2/2005 | Nishida | G02B 5/005 |
| | | | 348/E9.027 |
| 2010/0117175 A1* | 5/2010 | Shizuno | H01L 27/14618 |
| | | | 257/E31.127 |
| 2015/0219937 A1* | 8/2015 | Matsumoto | G02B 21/0024 |
| | | | 359/279 |
| 2015/0301256 A1* | 10/2015 | Takiguchi | G02B 5/18 |
| | | | 359/9 |
| 2018/0212684 A1* | 7/2018 | Aoyama | G06F 3/04845 |
| 2020/0404248 A1* | 12/2020 | Mendlovic | G06T 5/50 |

FOREIGN PATENT DOCUMENTS

WO  WO 2017/145348 A1  8/2017
WO  WO 2019/176349 A1  9/2019

OTHER PUBLICATIONS

Young, Zone Plates and Their Aberrations, Journal of the Optical Society of America, Aug. 1972, pp. 972-976, vol. 62, No. 8.

* cited by examiner

IMAGING DEVICE MANUFACTURING APPARATUS, METHOD FOR MANUFACTURING IMAGING DEVICE, AND IMAGING DEVICE

CROSS REFERENCE TO PRIOR APPLICATION

This application is a National Stage Patent Application of PCT International Patent Application No. PCT/JP2020/043169 (filed on Nov. 19, 2020) under 35 U.S.C. § 371, which claims priority to Japanese Patent Application No. 2019-218883 (filed on Dec. 3, 2019), which are all hereby incorporated by reference in their entirety.

TECHNICAL FIELD

The present disclosure relates to an imaging device manufacturing apparatus, a method for manufacturing an imaging device, and an imaging device, and more particularly, to an imaging device manufacturing apparatus, a method for manufacturing an imaging device, and an imaging device that are designed to be capable of increasing the quality of an image to be reconstructed by a lensless camera.

BACKGROUND ART

There is a widely known lensless camera technique by which a mask provided with a two-dimensional pattern formed with transmission regions and a non-transmission region is set in the stage before an image sensor, and light radiated from a scene is reconstructed on the basis of observation values projected onto a sensor through the mask.

In a lensless camera, information regarding how light radiated from a scene is projected onto a sensor through a mask is defined beforehand as a matrix, and the actual scene is reproduced from the matrix and an image projected onto the sensor (see Non-Patent Document 1).

The transmission regions forming this mask may be simple holes formed in the non-transmission region shielded from light, or may have light condensing elements such as lenses disposed in the respective holes.

In a case where the transmission regions are simple holes, if the size of the holes is large, the light to form an image on the sensor is blurred, and the image quality of the image to be reconstructed is degraded.

On the other hand, in a case where light condensing elements such as lenses are disposed in holes serving as the transmission regions, light is condensed to prevent the blurring of an image formed on the sensor, and a sharp image is formed. Thus, the image quality of the image to be reconstruct can be enhanced.

Meanwhile, in a lensless camera using a mask in which lenses are disposed in holes forming transmission regions as described above, there is the relationship, $I=I_0 \cos^4 \theta$ between incident light of illuminance $I_0$ entering a lens at an incident angle $\theta$ and the transmitted light of illuminance I after entrance, according to the cosine fourth law. The light amount decreases, as the incident angle $\theta$ becomes larger.

Further, there is aberration in the lenses. As the incident angle becomes larger, the influence of coma aberration, distortion aberration, field curvature, astigmatism, and the like also becomes larger.

The influence of such a light quantity decrease and aberration appears more conspicuously in a lens at a position away from the center of the mask than in a lens disposed near the center of the mask.

Further, the light condensing elements to be disposed in the transmission regions may be Fresnel zone plates (FZPs), instead of lenses. An FZP is a light condensing element having a shape in which zones of transparent and opaque concentric circles are alternately arranged. The interval becomes narrower in a zone closer to the outside, and the FZP acts as an unequally spaced diffraction grating in which the direction of light entering on an outer side changes more greatly. Thus, incident light is condensed at one point on the optical axis.

It is known that, in the case of FZPs, coma aberration, field curvature, astigmatism, chromatic aberration, and the like also occur, as in lenses (see Non-Patent Document 2).

Such aberrations can be corrected with a plurality of lenses. However, the thickness of the camera hinders height reduction, and an increase in the number of lenses leads to higher costs.

In view of this, a method for changing the structure of FZPs to an optimum structure for the incident direction has been suggested (Patent Document 1).

CITATION LIST

Non-Patent Documents

Non-Patent Document 1: Boominathan, Vivek, et al. "Lensless Imaging: A computational renaissance", IEEE Signal Processing Magazine 33.5 (2016): 23-35.
Non-Patent Document 2: Young, Matt. "Zone plates and their aberrations", JOSA 62.8 (1972): 972-976.

PATENT DOCUMENT

Patent Document 1: US 2015/0219808 A

SUMMARY OF THE INVENTION

Problems to be Solved by the Invention

However, in a case where various scenes are imaged by a lensless camera, light enters the light condensing elements forming the transmission regions in the mask from various directions. Therefore, if the light condensing elements are not appropriately adjusted, image quality might be degraded.

The present disclosure is made in view of such circumstances, and particularly, aims to enhance the image quality of a reconstructed image based on observation values projected onto a sensor, by appropriately adjusting the light condensing elements forming the transmission regions in a mask to be used in a lensless camera.

Solutions to Problems

An imaging device manufacturing apparatus according to a first aspect of the present disclosure is an imaging device manufacturing apparatus that manufactures an imaging device that includes: a mask that is formed with a light shielding material that blocks incident light, has a plurality of transmission regions that are formed in part of the light shielding material and transmit the incident light, and has a light condensing element that is disposed in the transmission regions and condenses the incident light, to modulate and transmit the incident light; an imaging element that images the incident light modulated by the mask as a pixel signal; and a reconstruction unit that reconstructs the pixel signal as a final image by signal processing. The imaging device manufacturing apparatus includes an adjustment unit that adjusts the light condensing element, on the basis of the incident range of the incident light entering the imaging element after passing through the mask, and the incident range of the incident light entering the imaging element after passing through the light condensing element.

A method for manufacturing an imaging device according to the first aspect of the present disclosure is a method for manufacturing an imaging device that includes: a mask that is formed with a light shielding material that blocks incident light, has a plurality of transmission regions that are formed in part of the light shielding material and transmit the incident light, and has a light condensing element that is disposed in the transmission regions and condenses the incident light, to modulate and transmit the incident light; an imaging element that images the incident light modulated by the mask as a pixel signal; and a reconstruction unit that reconstructs the pixel signal as a final image by signal processing. The method includes the step of adjusting the light condensing element, on the basis of the incident range of the incident light entering the imaging element after passing through the mask, and the incident range of the incident light entering the imaging element after passing through the light condensing element.

In the first aspect of the present disclosure, an imaging device manufacturing apparatus manufactures an imaging device that includes: a mask that is formed with a light shielding material that blocks incident light, has a plurality of transmission regions that are formed in part of the light shielding material and transmit the incident light, and has a light condensing element that is disposed in the transmission regions and condenses the incident light, to modulate and transmit the incident light; an imaging element that images the incident light modulated by the mask as a pixel signal; and a reconstruction unit that reconstructs the pixel signal as a final image by signal processing. In the imaging device manufacturing apparatus, the light condensing element is adjusted, on the basis of the incident range of the incident light entering the imaging element after passing through the mask, and the incident range of the incident light entering the imaging element after passing through the light condensing element.

An imaging device according to a second aspect of the present disclosure is an imaging device that includes: a mask that is formed with a light shielding material that blocks incident light, has a plurality of transmission regions that are formed in part of the light shielding material and transmit the incident light, and has a light condensing element that is disposed in the transmission regions and condenses the incident light, to modulate and transmit the incident light; an imaging element that images the incident light modulated by the mask as a pixel signal; and a reconstruction unit that reconstructs the pixel signal as a final image by signal processing. In the imaging device, the light condensing element is adjusted, on the basis of the incident range of the incident light entering the imaging element after passing through the mask, and the incident range of the incident light entering the imaging element after passing through the light condensing element.

In the second aspect of the present disclosure, incident light is modulated and transmitted by a mask that is formed with a light shielding material that blocks incident light, has a plurality of transmission regions that are formed in part of the light shielding material and transmit the incident light, and has a light condensing element that is disposed in the transmission regions and condenses the incident light. The modulated incident light is imaged as a pixel signal, and the pixel signal is reconstructed as a final image through signal processing. The light condensing element is adjusted, on the basis of the incident range of the incident light entering the imaging element after passing through the mask, and the incident range of the incident light entering the imaging element after passing through the light condensing element.

MODE FOR CARRYING OUT THE INVENTION

Figure 1:
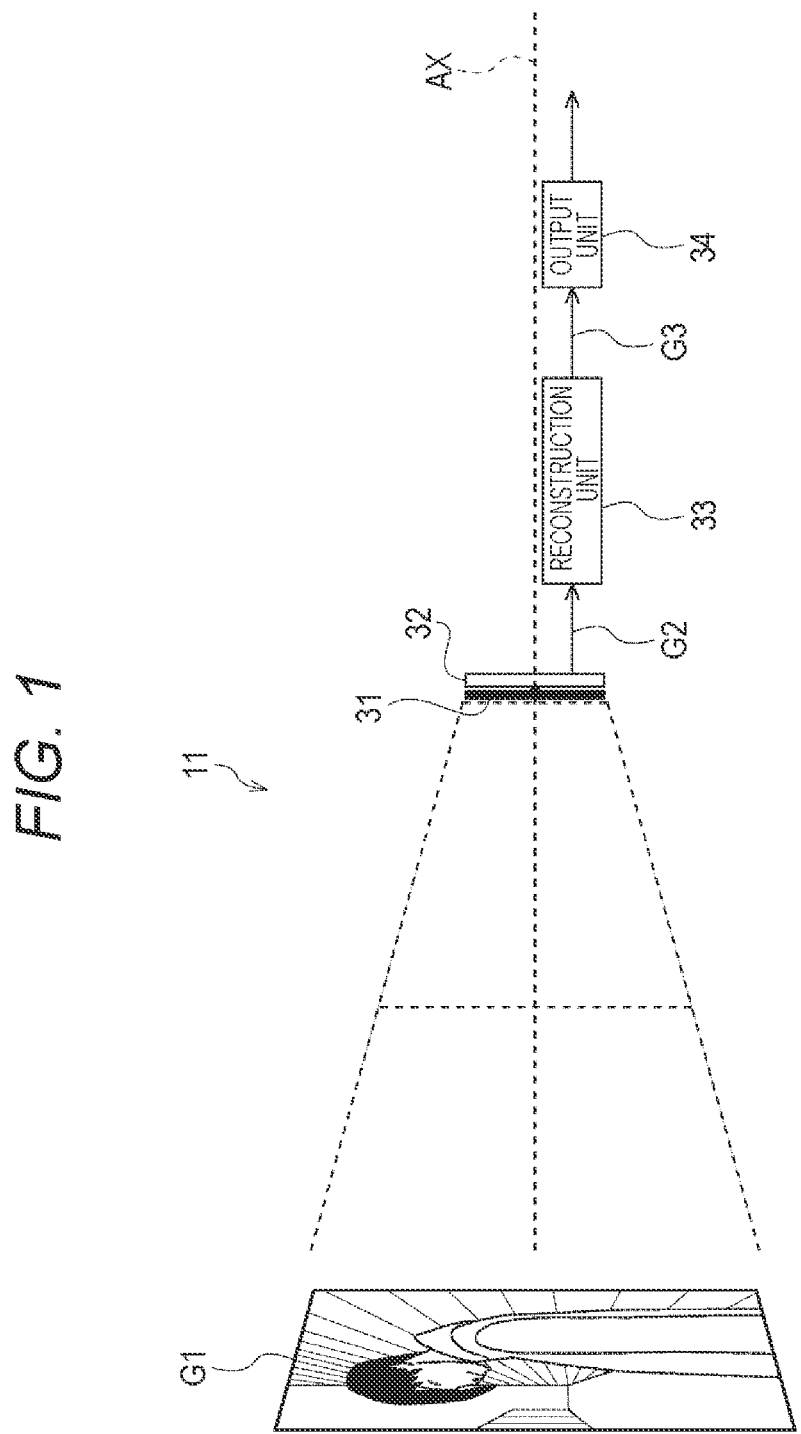
FIG. 1 is a diagram for explaining an example configuration of an imaging device according to the present disclosure.

The following is a detailed description of preferred embodiments of the present disclosure, with reference to the accompanying drawings. Note that, in this specification and the drawings, components having substantially the same functional configurations are denoted by the same reference numerals, and explanation of them will not be repeated.

The following is a description of modes for carrying out the present technology. Explanation will be made in the following order.

1. Imaging device according to the present disclosure
2. First embodiment of an imaging device manufacturing apparatus according to the present disclosure
3. Second embodiment of an imaging device manufacturing apparatus according to the present disclosure
4. Examples in which processes are carried out by software
5. Example applications to mobile structures

1. Imaging Device According to the Present Disclosure

Next, referring to FIG. 1, an example configuration of one embodiment of an imaging device according to the present disclosure is described. Note that FIG. 1 is a side cross-sectional view of an imaging device 11.

The imaging device 11 in FIG. 1 is a so-called lensless camera, and includes a mask 31, an imaging element 32, a reconstruction unit 33, and an output unit 34.

Figure 2:
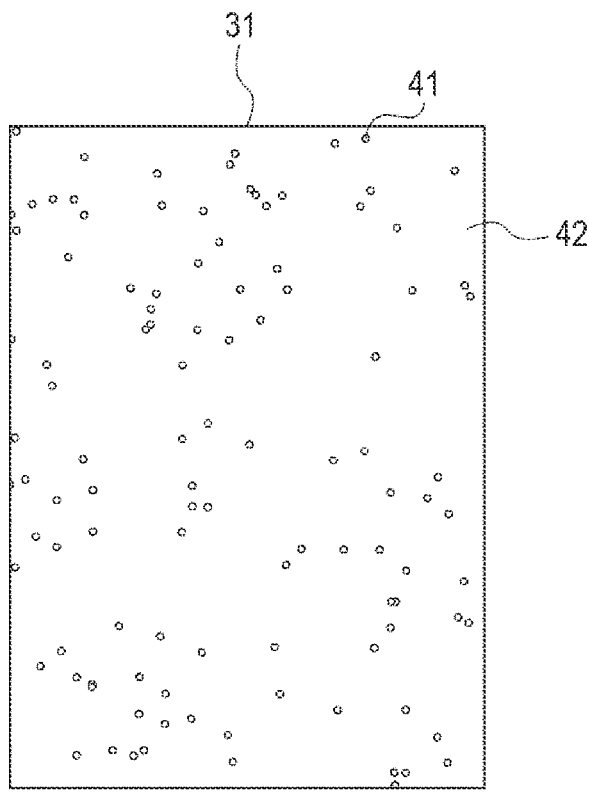
FIG. 2 is a diagram for explaining an example configuration of the mask shown in FIG. 1.

The mask 31 has a plate-like configuration that is formed with a light shielding material provided at the stage before the imaging element 32. For example, as shown in FIG. 2, the mask 31 includes transmission regions 41 in which light condensing elements formed with lenses, Fresnel zone plates (FZPs), or the like are provided in hole-like openings that transmit incident light, and a non-transmission region 42 that is not a transmission region and is shielded from light.

When the mask 31 receives incident light that is light from an object surface (a surface onto which light radiated from a three-dimensional object is actually directed) G1 indicated by an optical axis AX, the mask 31 transmits the incident light through the light condensing elements provided in the transmission regions 41, to modulate the entire incident light from the object surface G1, convert the incident light into modulated light, and cause the imaging element 32 to receive and image the converted modulated light.

The imaging element 32 is formed with a complementary metal oxide semiconductor (CMOS) image sensor or a charge coupled device (CCD) image sensor, captures an image formed with modulated light obtained by the mask 31 modulating incident light from the object surface G1, and outputs the captured image as an image G2 formed with a pixel-based signal to the reconstruction unit 33.

Note that the mask 31 has a size that covers at least the entire surface of the imaging element 32, and, basically, only light that is modulated while being transmitted through the mask 31 is received by the imaging element 32.

Further, the transmission regions 41 formed in the mask 31 has a larger size than at least the pixel size of the imaging element 32. Furthermore, a gap having a very short distance d is left between the imaging element 32 and the mask 31.

Figure 3:
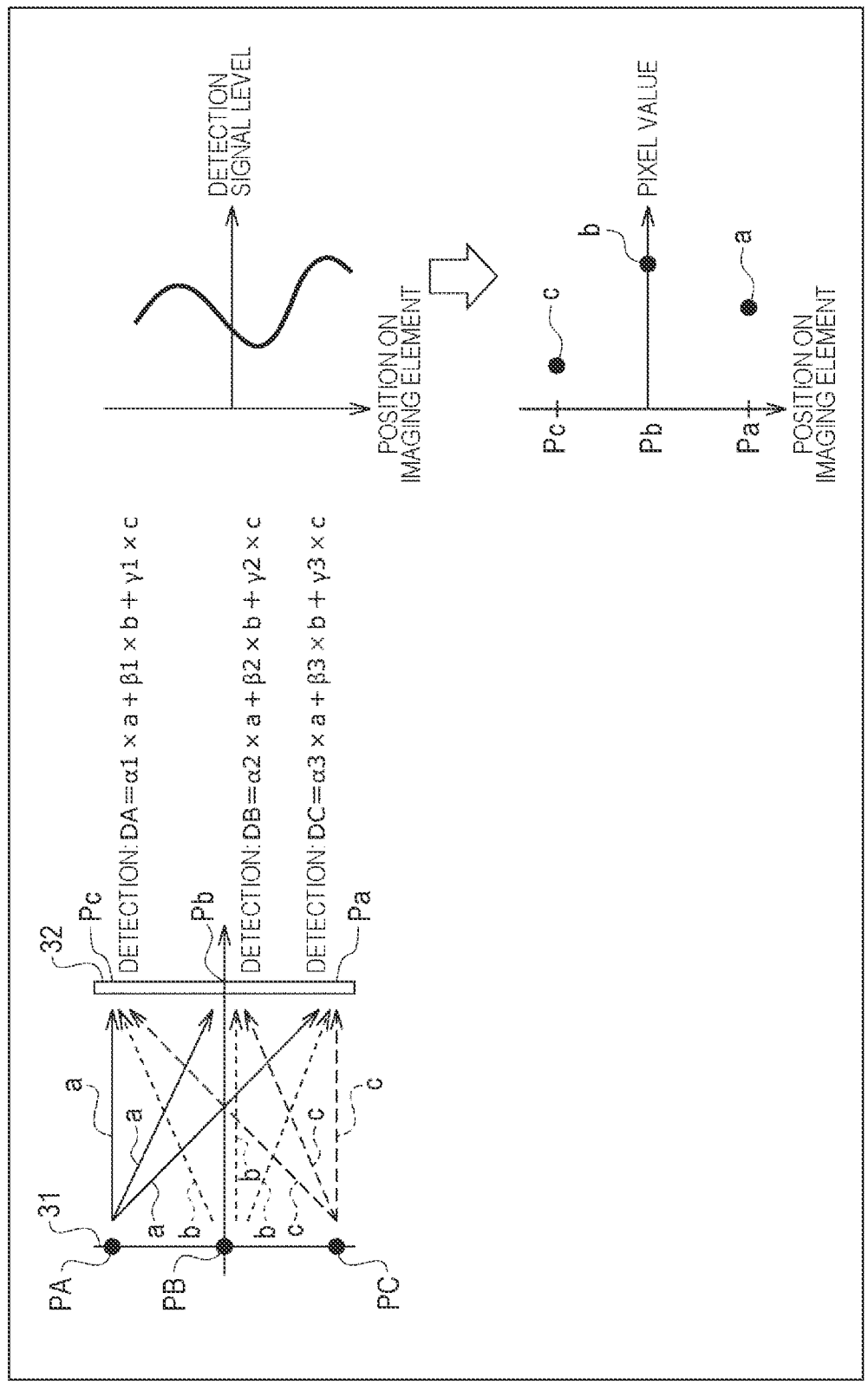
FIG. 3 is a diagram for explaining the principles of imaging in the imaging device shown in FIG. 1.

For example, as shown in the upper left portion of FIG. 3, incident light from point light sources PA, PB, and PC on the object surface G1 passes through the mask 31, and is received as light beams of light intensities a, b, and c at positions Pa, Pb, and Pc on the imaging element 32, respectively.

As shown in the upper left portion of FIG. 3, the detection sensitivity of each pixel has directivity depending on the incident angle, as the incident light is modulated by the transmission regions 41 formed in the mask 31. The detection sensitivity of each pixel having an incident angle directivity mentioned herein means that the light-receiving sensitivity characteristics depending on the incident angle of incident light vary with regions on the imaging element 32.

That is, in a case where it is assumed that the light source forming the object surface G1 is a point light source, light beams having the same light intensity emitted from the same point light source enter the imaging element 32. However, the incident angle varies with each region on the imaging surface of the imaging element 32, as the light beams are modulated by the mask 31. Further, the mask 31 changes the incident angle of the incident light depending on the regions on the imaging element 32, to achieve light-receiving sensitivity characteristics, which are incident angle directivities. Even light beams having the same light intensity are detected with different sensitivities in the respective regions on the imaging element 32 by the mask 31 provided at the stage before the imaging surface of the imaging element 32, and detection signals having different detection signal levels are detected in the respective regions.

More specifically, as shown in the upper right portion of FIG. 3, the detection signal levels DA, DB, and DC of the pixels at the positions Pa, Pb, and Pc on the imaging element 32 are expressed by the following Equations (1) to (3), respectively. Note that, in Equations (1) to (3) in FIG. 3, the vertical relationship is inverted from that among the positions Pa, Pb, and Pc on the imaging element 32 in FIG. 3.

$$DA = \alpha 1 \times a + \beta 1 \times b + \gamma 1 \times c \quad (1)$$

$$DB = \alpha 2 \times a + \beta 2 \times b + \gamma 2 \times c \quad (2)$$

$$DC = \alpha 3 \times a + \beta 3 \times b + \gamma 3 \times c \quad (3)$$

Here, $\alpha 1$ is the coefficient for the detection signal level a that is set in accordance with the incident angle of a light beam from the point light source PA on the object surface G1 to be restored at the position Pa on the imaging element 32.

Also, $\beta 1$ is the coefficient for the detection signal level b that is set in accordance with the incident angle of a light beam from the point light source PB on the object surface G1 to be restored at the position Pa on the imaging element 32.

Further, $\gamma 1$ is the coefficient for the detection signal level c that is set in accordance with the incident angle of a light beam from the point light source PC on the object surface G1 to be restored at the position Pa on the imaging element 32.

Accordingly, $(\alpha 1 \times a)$ in the detection signal level DA indicates the detection signal level of a light beam from the point light source PA at the position Pa.

Also, $(\beta 1 \times b)$ in the detection signal level DA indicates the detection signal level of a light beam from the point light source PB at the position Pa.

Further, $(\gamma 1 \times c)$ in the detection signal level DA indicates the detection signal level of a light beam from the point light source PC at the position Pa.

Therefore, the detection signal level DA is expressed as the combined value obtained by multiplying the respective components of the point light sources PA, PB, and PC at the position Pa by the coefficients $\alpha 1$, $\beta 1$, and $\gamma 1$. Hereinafter, the coefficients $\alpha 1$, $\beta 1$, and $\gamma 1$ will be collectively referred to as a coefficient set.

Likewise, as for the detection signal level DB in the point light source Pb, the coefficient set of $\alpha 2$, $\beta 2$, and $\gamma 2$ correspond to the coefficient set of $\alpha 1$, $\beta 1$, and $\gamma 1$, respectively, for the detection signal level DA in the point light source PA. Also, as for the detection signal level DC in the point light source Pc, the coefficient set of α3, β3, and γ3 correspond to the coefficient set of α1, β1, and γ1, respectively, for the detection signal level DA in the point light source Pa.

However, the detection signal levels of the pixels at the positions Pa, Pb, and Pc are values that are expressed by the sum of products of the coefficients and the light intensities a, b, and c of light beams emitted from the respective point light sources PA, PB, and PC. Therefore, the light intensities a, b, and c of light beams emitted from the respective point light sources PA, PB, and PC are mixed, and these detection signal levels differ from those at which an image of the object is formed. Note that the image formed with the detection signal levels DA, DB, and DB of the pixels at the positions Pa, Pb, and Pc corresponds to the image G2 in FIG. 1.

That is, simultaneous equations are formed with the coefficient set of α1, β1, and γ1, the coefficient set of α2, β2, and γ2, the coefficient set of α3, β3, and γ3, and the detection signal levels DA, DB, and DC, and the light intensities a, b, and c are solved, so that the pixel values at the respective positions Pa, Pb, and Pc are obtained as shown in the lower right portion of FIG. 3. As a result, a restored image (final image) that is a set of pixel values is reconstructed and restored. Note that this reconstructed image corresponds to the image G3 in FIG. 1.

Further, in a case where the distance between the imaging element 32 and the object surface G1 shown in the upper left portion of FIG. 3 changes, the coefficient set of α1, β1, and γ1, the coefficient set of α2, β2, and γ2, and the coefficient set of α3, β3, and γ3 each change. However, as these coefficient sets are changed, a restored image (final image) of the object surface at various distances can be reconstructed.

Accordingly, by changing the coefficient sets to those corresponding to various distances through one-time imaging, an image of the object surface at various distances from the imaging position can be reconstructed.

As a result, in imaging using the imaging device 11 shown in FIG. 1, there is no need to be aware of a phenomenon such as so-called defocusing in which the focal point is shifted in the imaging with an imaging device using a lens. As long as imaging is performed so that the object to be imaged stays in the field of view, it is possible to reconstruct an image of the object surface at various distances after imaging, by changing the coefficient sets in accordance with the distance.

Note that the detection signal levels shown in the upper right portion of FIG. 3 are not the detection signal levels corresponding to an image in which an image of the object is formed. Therefore, the detection signal levels are not the pixel values but simple observation values, and an image formed with the observation values corresponds to the image G2. Further, the detection signal levels shown in the lower right portion of FIG. 3 are the signal values of the respective pixels corresponding to an image in which an image of the object is formed, or the values of the respective pixels of a restored image (final image) restored on the basis of the image G2. Accordingly, these detection signal levels are the pixel values. That is, this restored image (final image) of the object surface G1 corresponds to the image G3.

With such a configuration, the imaging device 11 can function as a so-called lensless camera. As a result, an imaging lens is not an essential component, and thus, it is possible to reduce the height of the imaging device, or to reduce the thickness with respect to the incident direction of light in the configuration that realizes the imaging function. Further, by changing coefficient sets in various manners, it is possible to reconstruct and restore the final image (restored image) on the object surface at various distances.

Note that, hereinafter, an image that is captured by the imaging element 32 and corresponds to the image G2 before being reconstructed will be simply referred to as a captured image, and an image that is reconstructed through signal processing performed on a captured image and corresponds to the image G3 will be referred to as the final image (restored image). Accordingly, the coefficient sets described above are changed in various manners, so that an image on the object surface G1 at various distances can be reconstructed as the final image from one captured image.

The reconstruction unit 33 has the coefficient sets described above, reconstructs the final image (restored image) (the image G3 in FIG. 1) on the basis of the captured image (the image G2 in FIG. 1) captured by the imaging element 32 using the coefficient set corresponding to the distance from the imaging position of the imaging device 11 to the object surface G1, and outputs the final image (restored image) to the output unit 34.

The output unit 34 performs signal processing on the final image supplied from the reconstruction unit 33, and outputs the processed final image as an image signal.

<Imaging Process by the Imaging Device Shown in FIG. 1>

Figure 4:
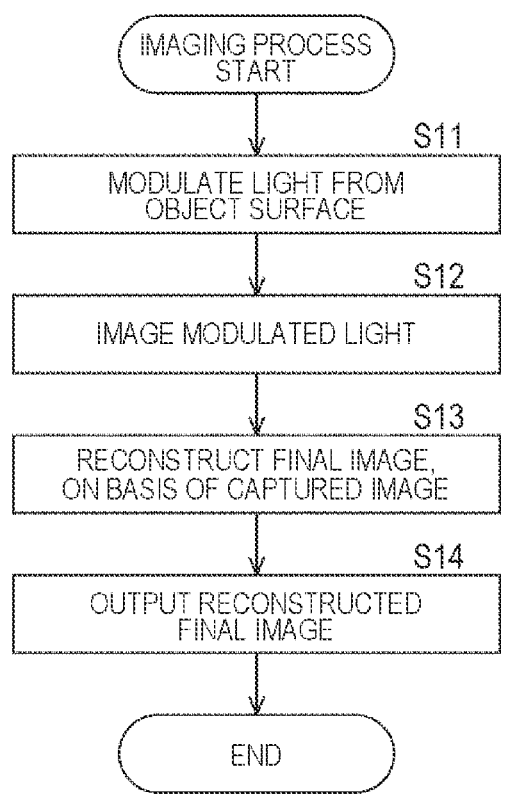
FIG. 4 is a flowchart for explaining an imaging process to be performed by the imaging device shown in FIG. 1.

Next, an imaging process to be performed by the imaging device 11 shown in FIG. 1 is described with reference to a flowchart shown in FIG. 4.

In step S11, the mask 31 modulates light from the object surface G1, and causes the light to enter the imaging element 32.

In step S12, the imaging element 32 captures an image formed with the light that is the light from the object surface G1 and is modulated by the mask 31, and outputs the captured image (corresponding to the image G2) to the reconstruction unit 33.

In step S13, on the basis of the captured image (corresponding to the image G2) obtained by capturing the image formed with the modulated light output from the imaging element 32, the reconstruction unit 33 reconstructs an image using a predetermined coefficient set in accordance with the distance from the imaging position of the imaging device 11 to the object surface G1, and outputs the image as the final image (restored image) (corresponding to the image G3) to the output unit 34. That is, for the captured image, the final image (restored image) is obtained by forming and solving simultaneous equations using the coefficient sets described above with reference to Equations (1) to (3).

In step S14, the output unit 34 performs signal processing, and outputs an image signal.

That is, through the series of processes described above, modulation is performed using a mask but not using any lens, and the final image (restored image) is then reconstructed using the coefficient set. Thus, height reduction can be realized, and images at various distances can be reconstructed by one-time imaging.

2. First Embodiment of an Imaging Device Manufacturing Apparatus According to the Present Disclosure <Mask Pattern>

Next, a mask pattern that is a layout pattern of the transmission regions 41 in the mask 31 in the imaging device 11 shown in FIG. 1 is described.

Various mask patterns have been suggested as the mask pattern of the mask 31 in the imaging device 11 shown FIG.

1, and these suggested mask patterns include a mask pattern called a modified uniformly redundant arrays (MURA) mask, a mask pattern called a uniformly redundant arrays (URA) mask, and the like. These patterns each have a repetitive structure called a cyclic coded mask, and are patterns that are often used in the world of coded aperture imaging in which a scene is reconstructed using a mask.

Note that, regarding a MURA mask and a URA mask, see Non-Patent Document 1.

Further, in the mask 31 shown FIG. 2 described above, the transmission regions 41 are arranged in accordance with a mask pattern called a Singer URA pattern of URA mask patterns.

Note that, regarding the Singer URA pattern, see A. Busboom, H. Elders-Boll, and H. D. Shotton, "Uniformly redundant arrays", Experimental Astronomy 8.2 (1998): pp. 97-123, 1998.

By using the mask 31 that may have various patterns in this manner, it is possible to reconstruct a scene image corresponding to the object surface G1 shown in FIG. 1.

In the mask 31 shown in FIG. 2, the aperture ratio of the pattern forming the transmission regions 41 is 0.9%, which is extremely low, and only slight light passes through the imaging element 32. Therefore, the signal-to-noise ratio (S/N) is poor.

Furthermore, in a case where the transmission regions 41 are not provided with any light condensing element and are simple pinhole-like openings, the image on the imaging element 32 is blurred due to strong influence of diffraction.

Therefore, in the transmission regions 41 in the mask 31 of the imaging device 11 according to the present disclosure, light condensing elements such as lenses or Fresnel zone plates (FZPs) are disposed. Thus, the influence of diffraction is reduced, and the amount of incident light is increased, so that a sharp image can be captured at the imaging element 32.

Note that, regarding a specific method for disposing lenses in the transmission regions 41 of the mask 31 formed with a MURA mask pattern, see US 2010/0220212 A.

As the incident light transmitted by the light condensing elements provided in the transmission regions 41 is condensed in this manner, the S/N can be enhanced.

In a case where the transmission regions 41 of the mask 31 are formed in accordance with a MURA pattern, the ratio of incident light to the mask 31 is 50%. However, where lenses or FZPs are provided in accordance with the Singer URA pattern, incident light can be used at a ratio exceeding 50%, and as a result, the S/N becomes higher.

<Adjustment of the Optical Axes of Lenses>

However, in a case where light condensing elements such as lenses or FZPs are disposed in the transmission regions 41 of the mask 31, as incident light deviates outward from the optical axis direction in each light condensing element, a decrease in peripheral light amount occurs according to the cosine fourth law, and further, the influence of aberration also increases. Therefore, the optical axis of a light condensing element disposed in the transmission regions 41 of the mask 31 can reduce the decrease in image quality by a larger amount if the optical axis is closer to the incident direction of the incident light.

An image in the lensless camera formed with the imaging device 11 of the present disclosure is reconstructed as described below.

First, as described above, in an example, light radiated from a scene is expressed by luminance values (corresponding to the detection signal levels a, b, and c of light beams of the light intensities a, b, and c of the point light sources PA, PB, and PC on object surface G1 in FIG. 3) of a plurality of three-dimensional sampling points, and a plurality of sets of sensor observation values of modulated light projected onto the imaging element 32 through the mask 31 (the detection signal levels DA, DB, and DC of the pixels at the positions Pa, Pb, and Pc on the imaging element 32 in FIG. 3) is obtained through a simulation or the like.

Next, a mask matrix (coefficient sets including the coefficients $\alpha 1$ to $\alpha 3$, $\beta 1$ to $\beta 3$, $\gamma 1$ to $\gamma 3$, and the like in Equations (1) to (3) described above) representing the mask 31 is calculated from the sets of sensor observation values of modulated light.

An inverse matrix of the matrix forming the mask matrix including the coefficient sets is then obtained.

As a result, it becomes possible to restore the luminance values of the respective sampling points by multiplying the captured image (corresponding to the image G2) forming the observation values by the inverse matrix, and thus, the final image (corresponding to the image G3) can be reconstructed.

Where the luminance values (corresponding to the detection signal levels a, b, and c in FIG. 3) of light beams emitted from P sampling points in a three-dimensional space are expressed as a radiated light vector x with P elements, and the observation values (corresponding to the detection signal levels DA, DB, and DC of the pixels at the positions Pa, Pb, and Pc on the imaging element 32 in FIG. 3) of the respective pixels in the two-dimensional imaging element 32 formed with N pixels that receives the light are expressed as a scene observation value vector y with N elements, the relationship between these vectors is expressed by Equation (4) shown below.

$$y = Mx \qquad (4)$$

Here, M represents a transmission function formed with a mask matrix that expresses the modulation of the mask 31 (the matrix: a matrix of coefficient sets including the coefficients $\alpha 1$ to $\alpha 3$, $\beta 1$ to $\beta 3$, $\gamma 1$ to $\gamma 3$, and the like in Equations (1) to (3) described above).

On the basis of such a relationship, the reconstruction unit 33 obtains the radiated light vector x by multiplying the observation value vector y by the inverse matrix $M^{-1}$ of the mask matrix M, and thus, reconstructs the restored image (final image).

The observation value vector y in Equation (4) indicates that the scene to be observed is formed only with light that has been transmitted and modulated through the mask 31.

Therefore, in a case where light from outside the mask 31 enters the imaging element 32 and affects the values forming the elements of the observation value vector y, the light from outside the mask 31 appears as noise in the image reconstructed with the observation value vector y.

(Camera Field of View CFOV)

Here, a camera field of view CFOV formed with incident angles that can be reconstructed as the final image and are transmitted through the mask 31 to enter the imaging element 32 is defined.

Note that the non-transmission region 42 of the mask 31 is shielded from incident light, but the transmission regions 41 may be disposed at any positions on the mask 31. Therefore, when the incident range of incident light is taken into consideration, the entire surface on the mask 31 is assumed to be the transmission regions 41.

That is, in a case where only the incident light within the camera field of view CFOV is modulated through the mask 31, then enters the imaging element 32, and is captured as a captured image by the imaging element 32, the final image restored on the basis of this captured image theoretically does not include noise.

In that case, the camera field of view CFOV can be defined as described below.

Figure 5:
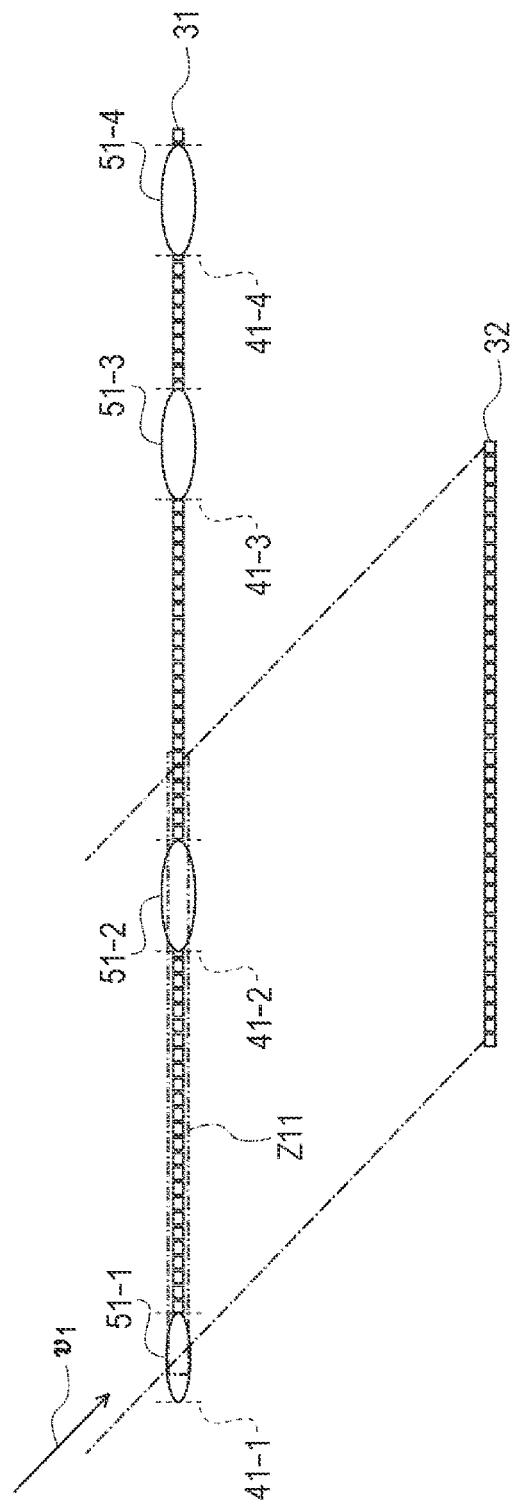
FIG. 5 is a diagram for explaining a camera field of view CFOV.

FIG. 5 shows the relationship between the mask 31 and the imaging element 32 when lenses 51-1 to 51-4 are provided as the light condensing elements in the transmission regions 41-1 to 41-4 on the mask 31, respectively.

Here, the direction of an arrow v1 in FIG. 5 indicates an incident direction of incident light with respect to the mask 31 and the imaging element 32. As for incident light in the direction of the arrow v1, light passing through a range Z11 of the mask 31 enters the imaging element 32, and light passing through the left edge of the range Z11 enters the left edge of the imaging element 32.

Therefore, the direction of the arrow v1 is the angle of the edge in the leftward direction in the drawing of the camera field of view CFOV.

Figure 6:
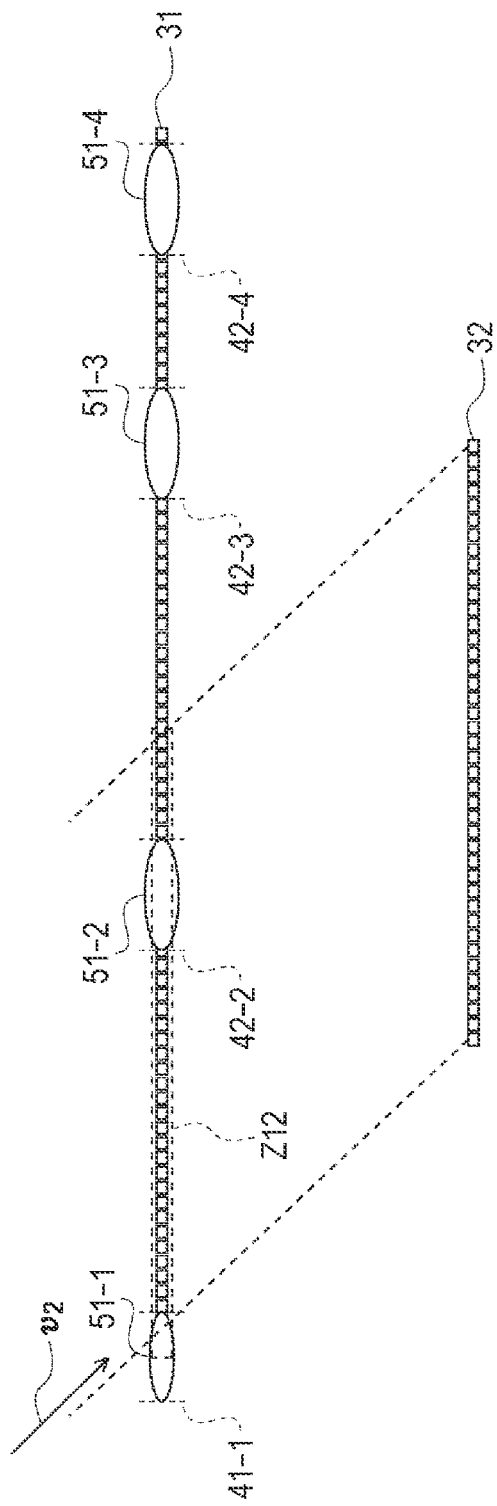
FIG. 6 is a diagram for explaining a camera field of view CFOV.

Likewise, as shown in FIG. 6, incident light in the direction of an arrow v2 slightly inclined to the right with respect to the arrow v1 is incident light from a direction slightly inclined to the right with respect to the incident light in the direction of the arrow v1, and the light transmitted through a range Z12 that is a position slightly on the right side on the mask 31 enters the imaging element 32.

Figure 7:
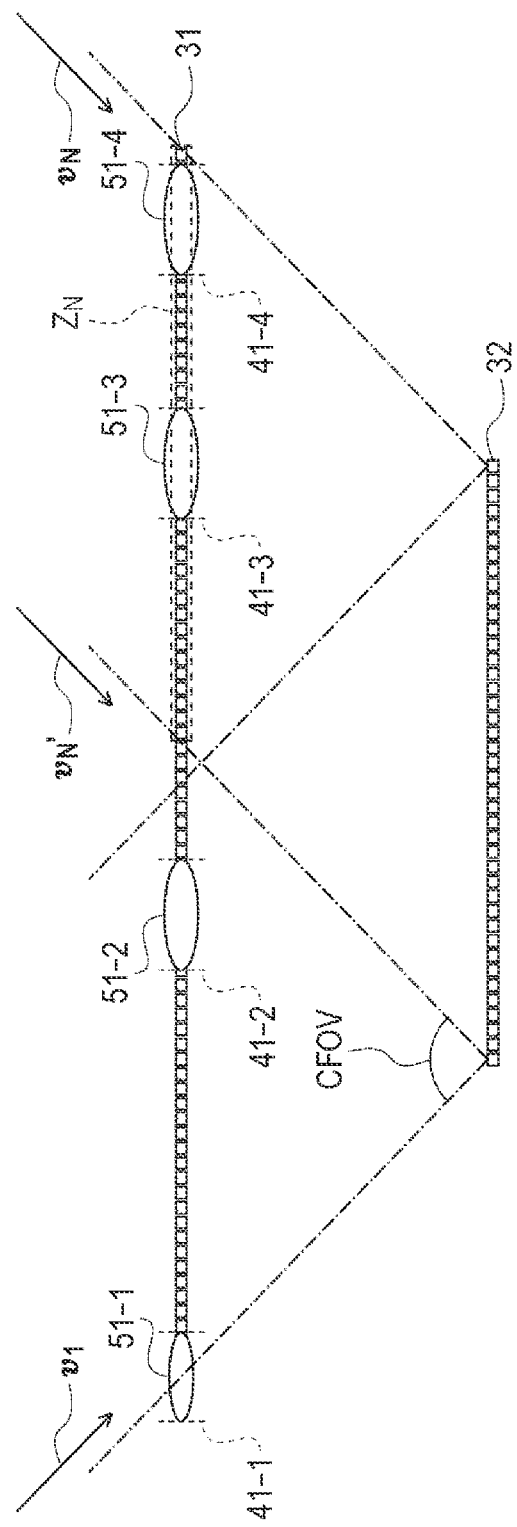
FIG. 7 is a diagram for explaining a camera field of view CFOV.

When the incident angle continues to be gradually inclined to the right as shown in FIG. 6, the light transmitted through a range ZN of the mask 31 then enters the imaging element 32, and incident light in the direction of an arrow vN at the right edge passes through the right edge of the mask 31 and enters the right edge of the imaging element 32 as shown in FIG. 7.

Therefore, the direction of the arrow vN is the angle of the edge in the rightward direction in the camera field of view CFOV.

From these facts, the range of incident light beams entering the imaging element 32 among the incident light beams transmitted through the mask 31 is the range from the direction of the arrow v1 to the direction of an arrow vN', and this range is the camera field of view CFOV. Here, the direction of the arrow vN' is a direction parallel to the direction of the arrow vN. Accordingly, it is safe to say that the camera field of view CFOV is also the range from the direction of the arrow v1 to the direction of the arrow vN.

That is, the camera field of view CFOV can be defined as the range of the incident direction of incident light that can pass through the mask 31 and enter the imaging element 32.

(Local Field of View LFOV of Each Lens)

Next, a local field of view LFOV of each lens 51 is defined as the range of incident light that passes through the lens 51 and enters the imaging element 32.

Figure 8:
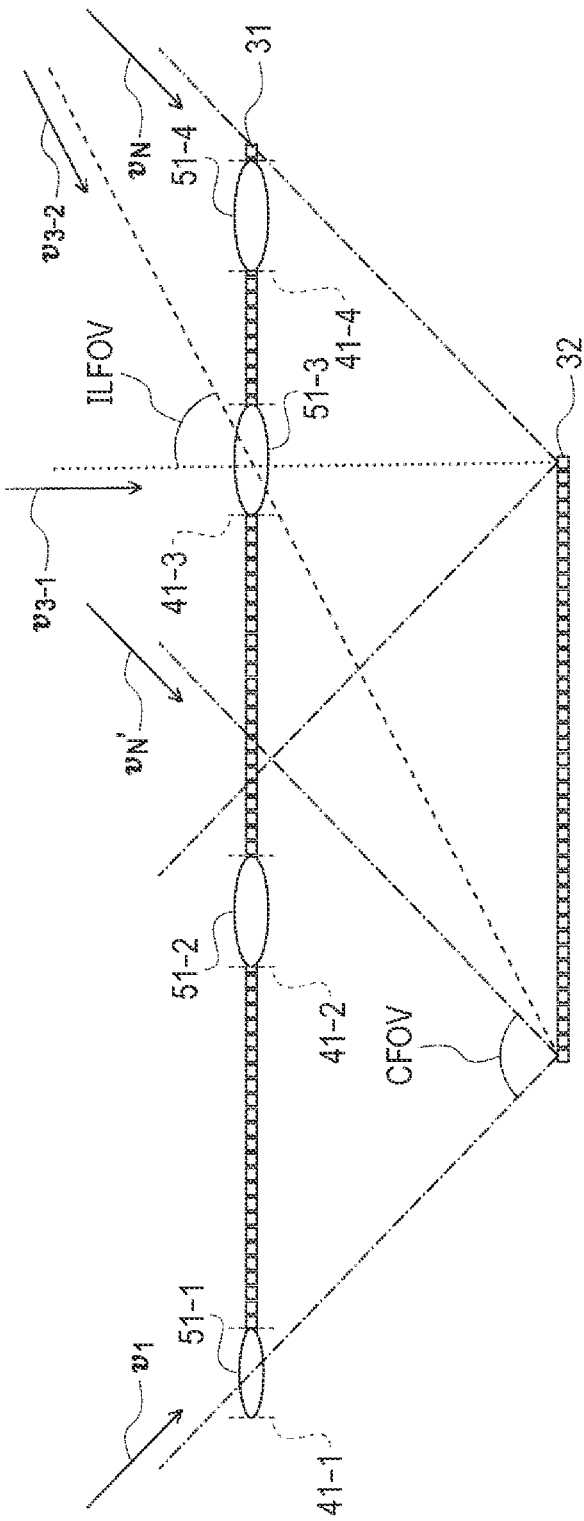
FIG. 8 is a diagram for explaining the initial local field of view ILFOV of each lens.

As for the lens 51-3 of the transmission region 41-3 in FIG. 8, the range of incident light that passes through the lens 51-3 and enters the imaging element 32 is between the direction of an arrow V3-1 and the direction of an arrow V3-2 in which light can enter edge portions of the imaging element 32.

Here, the range from the direction of the arrow V3-1 to the direction of the arrow V3-2 is defined as the initial local field of view ILFOV of the lens 51-3. That is, at the lens 51-3, any incident light within the range from the direction of the arrow V3-1 to the direction of the arrow V3-2, which is the initial local field of view ILFOV, can enter the imaging element 32.

However, as described above, in the initial local field of view ILFOV in FIG. 8, incident light from outside the camera field of view CFOV is merely noise in the final image to be reconstructed.

That is, at the lens 51-3, incident light in the initial local field of view ILFOV formed with the range from the direction of the arrow V3-1 to the direction of the arrow V3-2 can be made to enter the imaging element 32. However, in a case where the entire range on the mask 31 on which other transmission regions 41 (lenses 51) might be disposed is taken into consideration, light in a range out of the camera field of view CFOV in which light can pass through the mask 31 and enter the imaging element 32 cannot enter the imaging element 32.

Therefore, at each of the lenses 51 disposed in all the transmission regions 41 on the mask 31, an appropriate incident light range is the range belonging to the camera field of view CFOV in each initial local field of view ILFOV, or is the common range between each initial local field of view ILFOV and the camera field of view CFOV.

Figure 9:
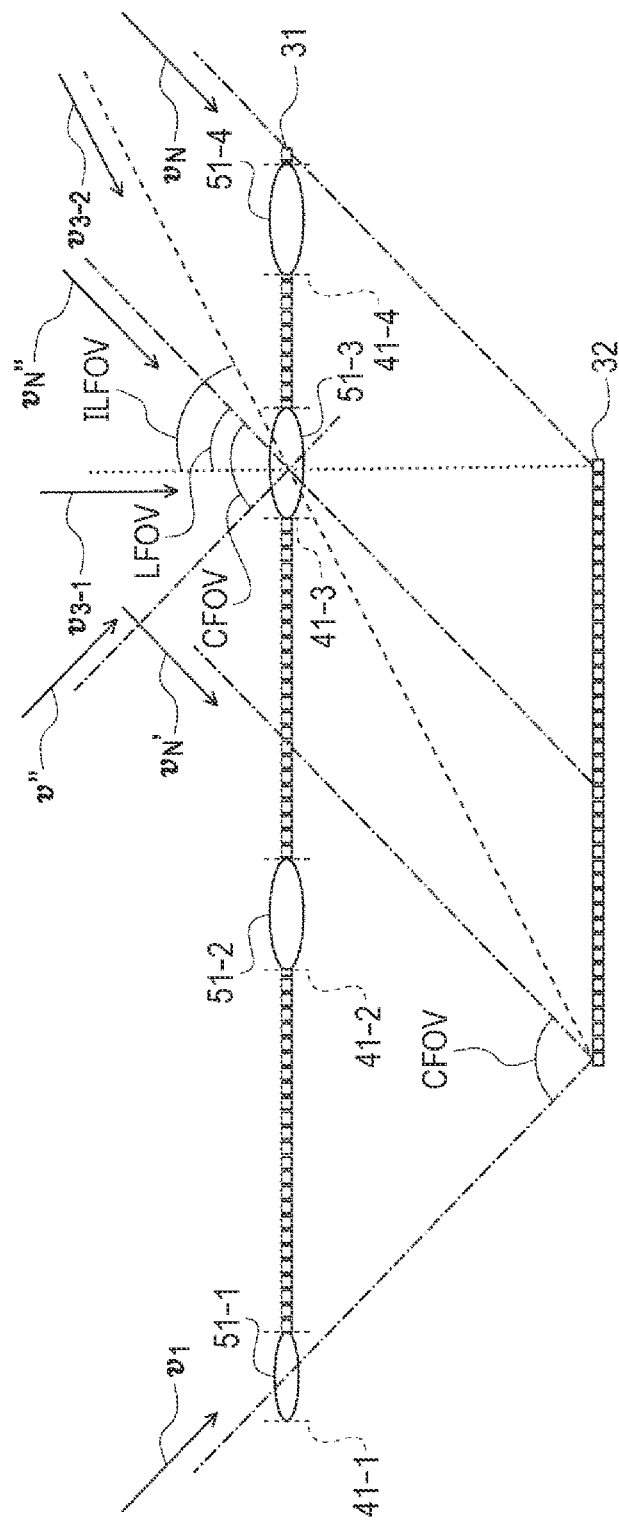
FIG. 9 is a diagram for explaining the local field of view ILFOV of each lens.

In the case of the lens 51-3 in FIG. 9, the range belonging to the camera field of view CFOV in the initial local field of view ILFOV is the range from the direction of the arrow v3-1 to the direction of an arrow vN".

Note that the camera field of view CFOV centering on the optical axis of the lens 51-3 in FIG. 9 is the range from the direction of an arrow v1' to the direction of the arrow vN", and the direction of the arrow v1' and the direction of the arrow vN" are parallel to the direction of the arrow v1 and the direction of the arrow vN, respectively.

Therefore, the range belonging to the camera field of view CFOV in the initial local field of view ILFOV, which is the range from the direction of the arrow v3-1 to the direction of the arrow vN (vN") in the case of the lens 51-3 in FIG. 9, is set as the local field of view LFOV.

This local field of view LFOV is set for each of the lenses 51.

<Lens Optimization Based on Local Field of View LFOV>

On the basis of the local field of view LFOV set for each of the lenses 51, the lenses 51 can be adjusted and optimized, and thus, the image quality of the final image to be reconstructed can be enhanced.

As one of the methods for performing optimization by adjusting a lens 51 using the local field of view LFOV, there is a method by which the lens 51 is disposed in a tilted manner so that the central direction of the local field of view LFOV (this direction will be hereinafter also referred to as the LFOV central direction) is aligned with the optical axis of the lens 51.

Figure 10:
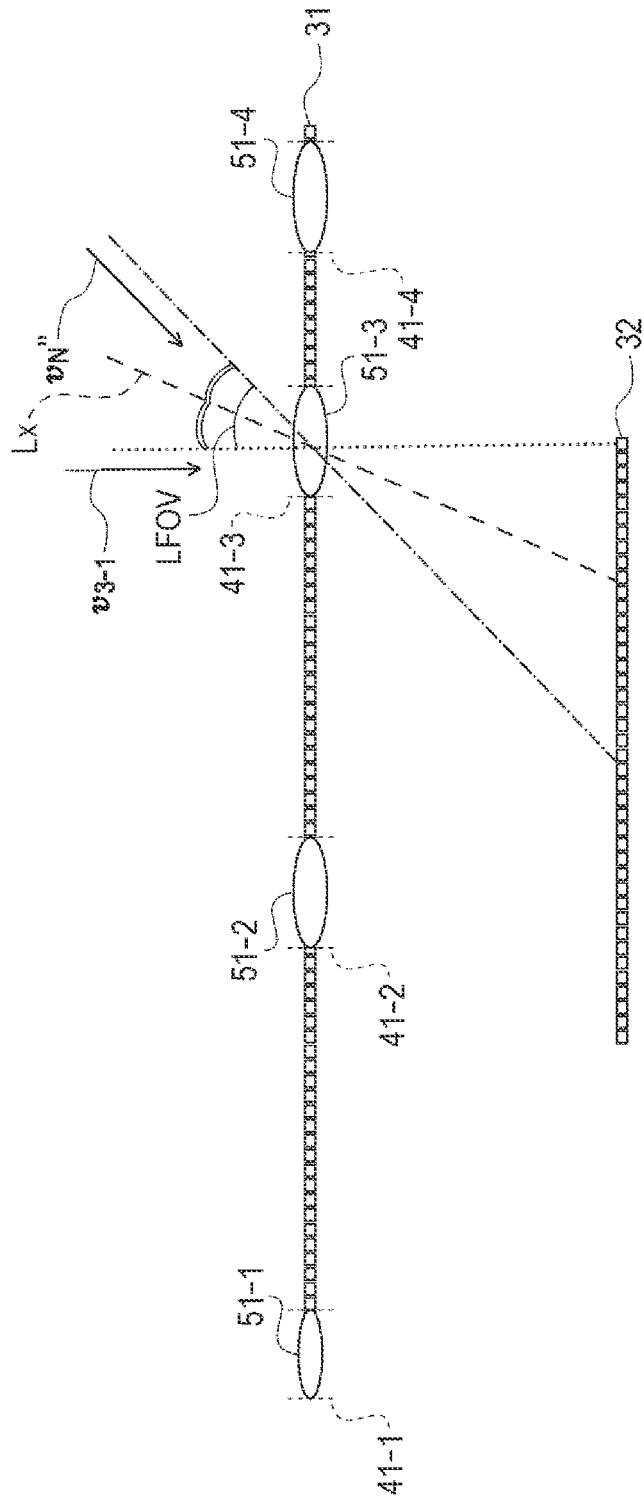
FIG. 10 is a diagram for explaining the LFOV central direction Lx of each lens.

That is, in the case of the lens 51-3, the direction that divides the angle forming the local field of view LFOV into two equal parts is the LFOV central direction Lx, as shown in FIG. 10.

As described above, for each lens 51, the LFOV central direction Lx is obtained, and the lens 51 is inclined and disposed so that the LFOV central direction Lx is aligned with the optical axis of the lens 51. Thus, the layout of the lenses 51 can be optimized for the local field of view LFOV.

Figure 11:
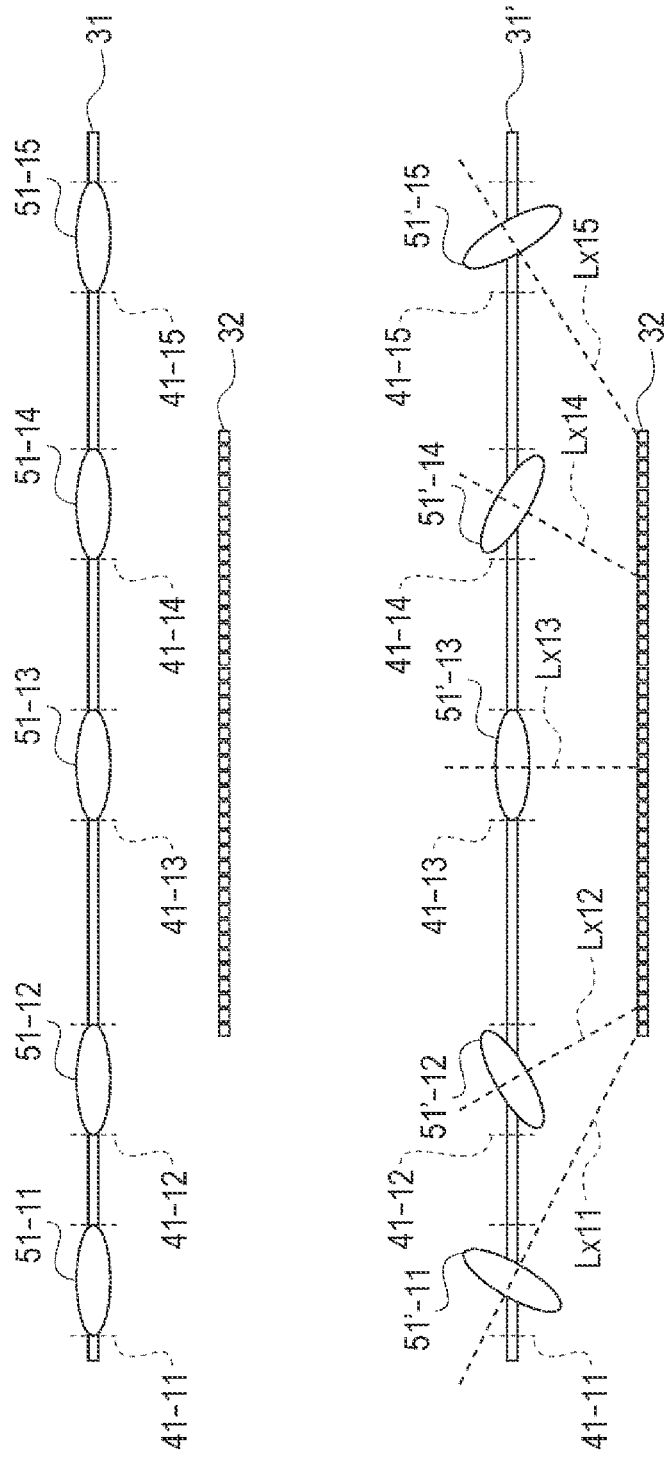
FIG. 11 is a diagram for explaining an example configuration of a mask in which the optical axis of each lens is aligned with the central direction of the local field of view.

That is, the upper portion of FIG. 11 illustrates a case where transmission regions 41-11 to 41-15 in the mask 31 are provided, and lenses 51-11 to 51-15 are disposed in the respective transmission regions so that the optical axes thereof become perpendicular to the surface of the mask 31, for example.

In a case where the respective lenses 51-11 to 51-15 are disposed as shown in the upper portion of FIG. 11, when the respective local fields of view LFOV are obtained, the LFOV central directions Lx11 to Lx15 can be obtained for the respective local fields of view LFOV.

With this arrangement, as indicated by lenses 51'-11 to 51'-15 in the lower portion of FIG. 11, optimization can be performed by tilting the optical axis directions of the lenses 51-11 to 51-15 so as to be aligned with the LFOV central direction Lx11 to Lx15, respectively.

As a result, the orientation of each lens 51 is adjusted so that the optical axis of each lens 51 is aligned with the LFOV central direction Lx of the local field of view LFOV of each lens 51, and thus, optimization is performed. In this case, the optical axis of each lens 51 is aligned with the LFOV central direction Lx that is the central direction of the local field of view LFOV, which is a range in which light can enter the imaging element 32. Thus, it is possible to minimize the decrease in the peripheral light amount and the influence of aberration that depend on the distance from the center of the optical axis of the lens 51.

Imaging Device Manufacturing Apparatus
According to the First Embodiment

Next, an example configuration of the first embodiment of an apparatus that manufactures the imaging device 11 including the mask 31 in which the installation directions of the lenses 51 are adjusted as described above is described with reference to FIG. 12.

Figure 12:
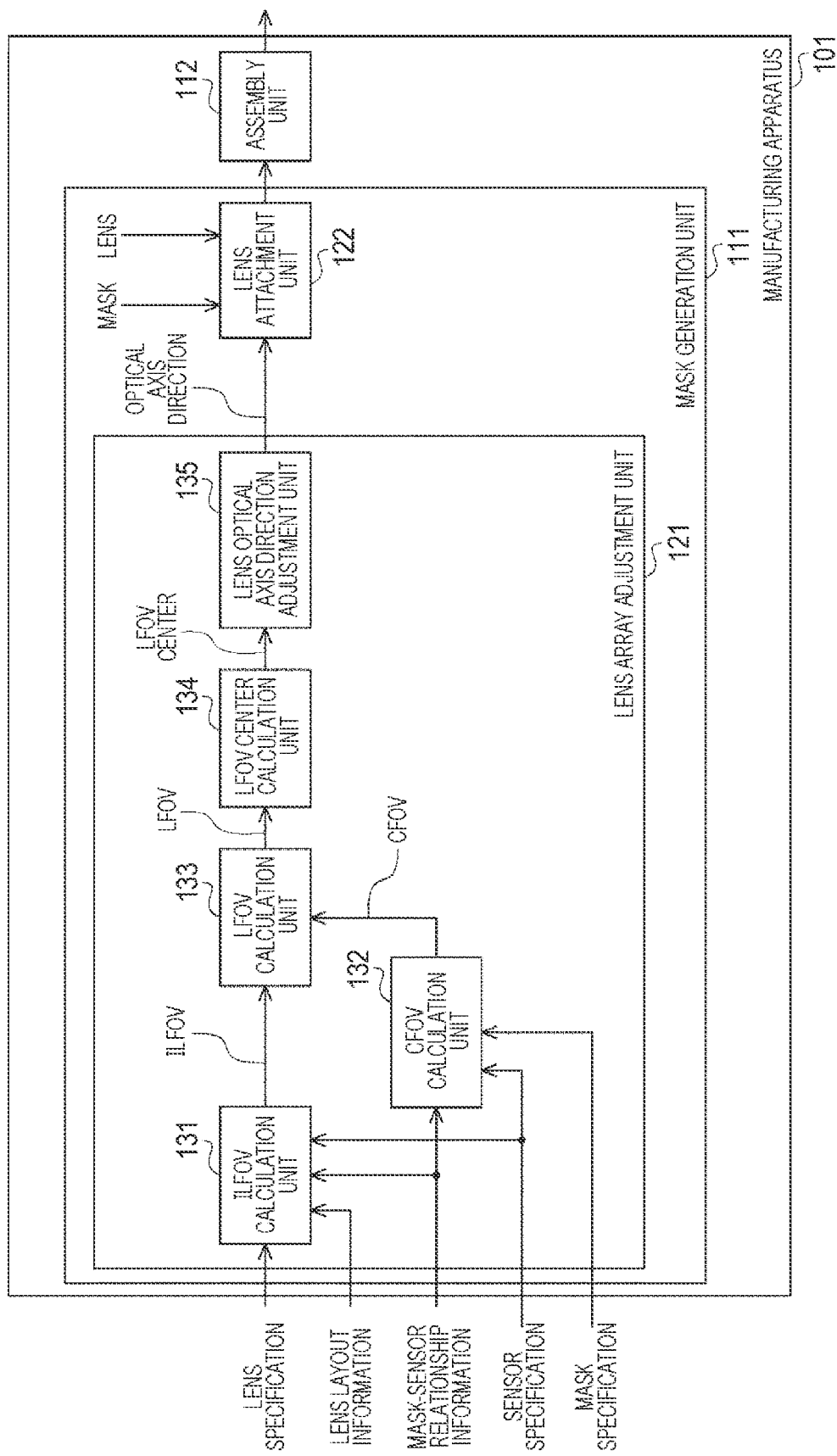
FIG. 12 is a diagram for explaining an example configuration of a first embodiment of an imaging device manufacturing apparatus according to the present disclosure.

A manufacturing apparatus 101 in FIG. 12 includes a mask generation unit 111 that generates the mask 31, and an assembly unit 112 that assembles the imaging device 11 by attaching the mask 31 generated by the mask generation unit 111.

The mask generation unit 111 forms the transmission regions 41 and the non-transmission region 42 in the mask 31, and further disposing the lenses 51 in the transmission regions 41, the lenses 51 being tilted in the optimized direction. The mask 31 generated in this manner is output to the assembly unit 112.

In doing so, when disposing the lenses 51 in the respective transmission regions 41 as described above, the mask generation unit 111 adjusts the orientation of each lens 51 so as to minimize the difference between the optical axis of each lens 51 and the LFOV central direction Lx of the local field of view LFOV of each lens 51.

With this arrangement, the lenses 51 in the optimized state are disposed in the transmission regions 41 of the mask 31. Thus, it is possible to minimize the decrease in the peripheral light amount and the influence of aberration that depend on the distance from the center of the optical axis of each lens 51.

The assembly unit 112 attaches the mask 31 supplied from the mask generation unit 111, the imaging element 32, the reconstruction unit 33, and the output unit 34 to one another, and thus, assembles and outputs the imaging device 11 shown in FIG. 1.

(Mask Generation Unit in FIG. 12)

More specifically, the mask generation unit 111 includes a lens array adjustment unit 121 and a lens attachment unit 122.

The lens array adjustment unit 121 adjusts the optical axis direction of each of the lenses 51 disposed in the transmission regions 41 of the mask 31 by the technique described above, on the basis of the lens specification, lens layout information, mask-sensor relationship information, the sensor specification, and the mask specification. Optical axis direction information and lens layout information are then output as the adjustment results to the lens attachment unit 122.

The lens attachment unit 122 forms the transmission regions 41 and the non-transmission region 42 in the mask 31, on the basis of the lens layout information supplied from the lens array adjustment unit 121. In each of the formed transmission regions 41, the lens attachment unit 122 then adjusts the optical axis of the lens 51 on the basis of the optical axis direction information supplied from the lens array adjustment unit 121, disposes the lenses 51, completes the mask 31, and outputs the mask 31 to the assembly unit 112.

(Lens Array Adjustment Unit in FIG. 12)

Meanwhile, the lens array adjustment unit 121 includes an ILFOV calculation unit 131, a CFOV calculation unit 132, a LFOV calculation unit 133, a LFOV center calculation unit 134, and a lens optical axis direction adjustment unit 135.

The ILFOV calculation unit 131 calculates the initial local field of view ILFOV of each lens 51 as described above with reference to FIG. 8 on the basis of the lens specification, the lens layout, the mask-sensor relationship information, and the sensor specification, and outputs the initial local field of view ILFOV to the LFOV calculation unit 133.

Here, the lens specification is information about the aperture and the focal length of the lenses 51, for example. Also, the lens layout is layout information about the transmission regions 41 in which the lenses 51 on the mask 31 are respectively disposed, for example. Further, the mask-sensor relationship information is information on the relative positional relationship between the mask 31 and the imaging element 32 as a sensor, and is information about deviation of the center position and the distance between the mask and the sensor, for example. Also, the sensor specification is information about the shape and the size of the imaging element 32 as a sensor, for example.

The CFOV calculation unit 132 calculates the camera field of view CFOV described above with reference to FIG. 7 on the basis of the mask-sensor relationship information, the sensor specification, and the mask specification, and outputs the camera field of view CFOV to the LFOV calculation unit 133.

Here, the mask specification is information about the shape and the size of the mask 31, for example.

The LFOV calculation unit 133 calculates the local field of view LFOV in each lens 51 as described above with reference to FIG. 9 on the basis of the initial local field of view ILFOV of each lens 51 supplied from the ILFOV calculation unit 131 and the camera field of view CFOV supplied from the CFOV calculation unit 132, and outputs the calculated local field of view LFOV to the LFOV center calculation unit 134.

The LFOV center calculation unit 134 calculates the LFOV central direction Lx, which is the central direction of the local field of view LFOV described above with reference to FIG. 10, on the basis of the local field of view LFOV of each lens 51 supplied from the LFOV calculation unit 133, and outputs the LFOV central direction Lx to the lens optical axis direction adjustment unit 135.

The lens optical axis direction adjustment unit 135 adjusts the optical axis direction of each lens 51 on the basis of the LFOV central direction Lx of each lens 51 supplied from the LFOV center calculation unit 134, and supplies information about the adjusted lens optical axis direction to the lens attachment unit 122.

More specifically, the lens optical axis direction adjustment unit 135 calculates an evaluation function that is formed with the difference between the LFOV central direction of each lens 51 supplied from the LFOV center calculation unit 134 and the optical axis direction of each lens 51, and adjusts the optical axis direction of each lens 51 so as to minimize the evaluation function. The lens optical axis direction adjustment unit 135 then outputs information about the optical axis direction of each lens 51 adjusted to minimize the evaluation function, to the lens attachment unit 122.

With this arrangement, the lens attachment unit 122 forms the transmission regions 41 and the non-transmission region 42 in the mask 31 in accordance with the mask specification, and disposes a lens 51 in each of the transmission regions 41 on the basis of the information about the adjusted optical axis direction supplied from the lens optical axis direction adjustment unit 135 of the lens array adjustment unit 121, so that the optical axis of the lens 51 is oriented as shown in the lower portion of FIG. 11, for example. Thus, the mask 31 is completed and is output to the assembly unit 112.

<Imaging Device Manufacturing Process to be Performed by the Manufacturing Apparatus Shown in FIG. 12>

Figure 13:
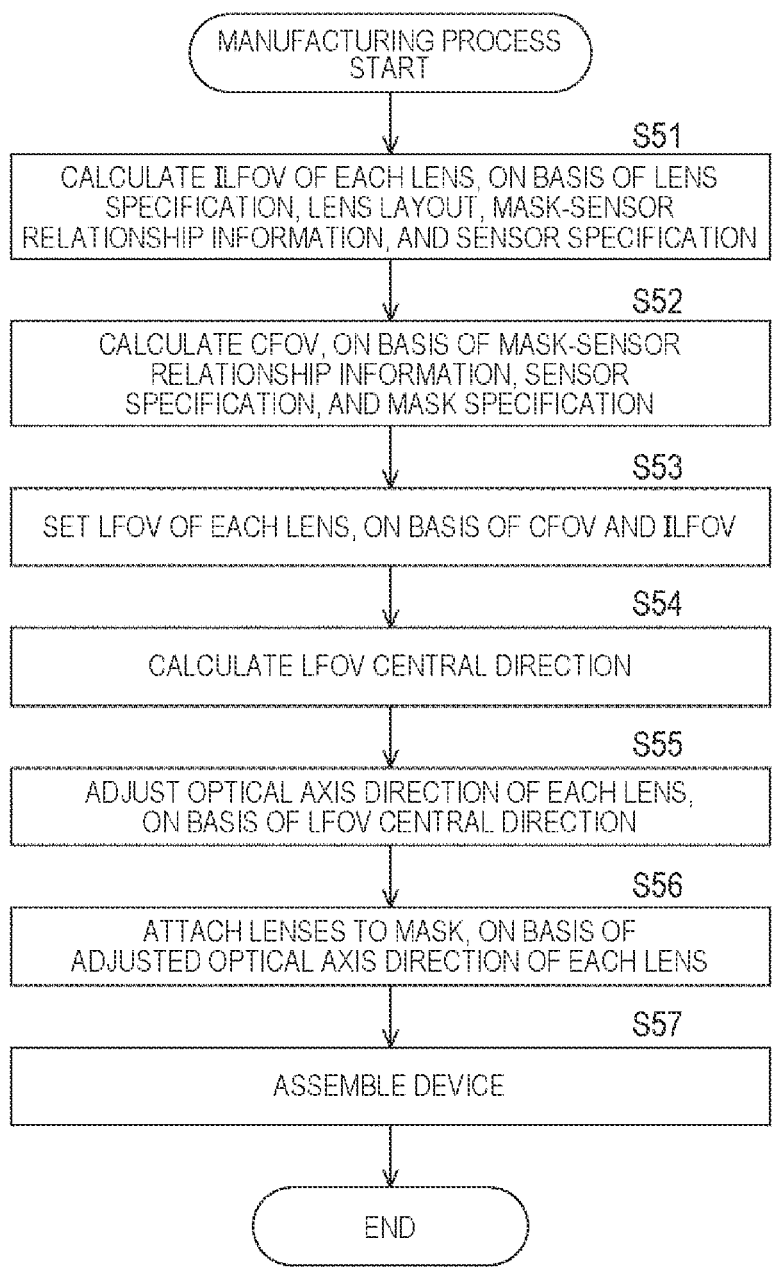
FIG. 13 is a flowchart for explaining a manufacturing process to be performed by the imaging device manufacturing apparatus shown in FIG. 12.

Next, the process to be performed by the manufacturing apparatus 101 shown in FIG. 12 to manufacture the imaging device 11 is described with reference to a flowchart shown in FIG. 13.

In step S51, the ILFOV calculation unit 131 calculates the initial local field of view ILFOV of each lens 51 on the basis of the lens specification, the lens layout, the mask-sensor relationship information, and the sensor specification, and outputs the initial local field of view ILFOV to the LFOV calculation unit 133.

In step S52, the CFOV calculation unit 132 calculates the camera field of view CFOV on the basis of the mask-sensor relationship information, the sensor specification, and the mask specification, and outputs the camera field of view CFOV to the LFOV calculation unit 133.

In step S53, the LFOV calculation unit 133 calculates the local field of view LFOV of each lens 51 on the basis of the initial local field of view ILFOV of each lens 51 supplied from the ILFOV calculation unit 131 and the camera field of view CFOV supplied from the CFOV calculation unit 132, and outputs the local field of view LFOV of each lens 51 to the LFOV center calculation unit 134.

In step S54, the LFOV center calculation unit 134 calculates the LFOV central direction, which is the central direction of the local field of view LFOV, on the basis of the local field of view LFOV of each lens 51 supplied from the LFOV calculation unit 133, and outputs the LFOV central direction to the lens optical axis direction adjustment unit 135.

In step S55, the lens optical axis direction adjustment unit 135 calculates an evaluation function that is formed with the difference between the LFOV central direction of each lens 51 supplied from the LFOV center calculation unit 134 and the optical axis direction of each lens 51, and adjusts the optical axis direction of each lens 51 so as to minimize the evaluation function.

That is, in practice, the lens optical axis direction adjustment unit 135 adjusts the lens optical axis direction so that the LFOV central direction of each lens 51 supplied from the LFOV center calculation unit 134 substantially matches the optical axis direction of the lens 51.

The lens optical axis direction adjustment unit 135 then outputs information about the optical axis direction of each lens 51 adjusted to minimize the evaluation function, to the lens attachment unit 122.

In step S56, the lens attachment unit 122 forms the transmission regions 41 and the non-transmission region 42 in the mask 31, adjusts the optical axis of the lens 51 in each of the transmission regions 41 on the basis of the information about the adjusted optical axis direction of each lens 51 supplied from the lens optical axis direction adjustment unit 135 of the lens array adjustment unit 121, disposes the lenses 51 in the transmission regions 41 to complete the mask 31, and outputs the mask 31 to the assembly unit 112.

In step S57, the assembly unit 112 attaches the mask 31 having the lenses 51 disposed in the transmission regions 41, the imaging element 32, the reconstruction unit 33, and the output unit 34 to one another, the optical axes of the respective lenses 51 being adjusted to minimize the respective evaluation functions. In this manner, the imaging device 11 is completed.

Through the above processes, the lenses 51 disposed in the transmission regions 41 of the mask 31 can minimize the decrease in the peripheral light amount and the influence of aberration that depend on the distance from the center of the optical axis of each lens 51.

As a result, the lenses 51 as the light condensing elements forming the transmission regions 41 of the mask 31 that is used in the imaging device 11 functioning as a lensless camera can be appropriately adjusted, and the image quality of the final image to be reconstructed on the basis of the observation values projected onto the imaging element 32 can be enhanced.

2-1. First Modification

In the example described above, the direction of the optical axis of each lens 51 is adjusted without a change in the size of the lens 51, to reduce the decrease in the peripheral light amount and the influence of aberration that depend on the distance from the optical axis center. However, the diameter of each lens 51 may be increased in accordance with the distance from the center position of the mask 31, to increase the incident light amount and improve the S/N in the image.

Figure 14:
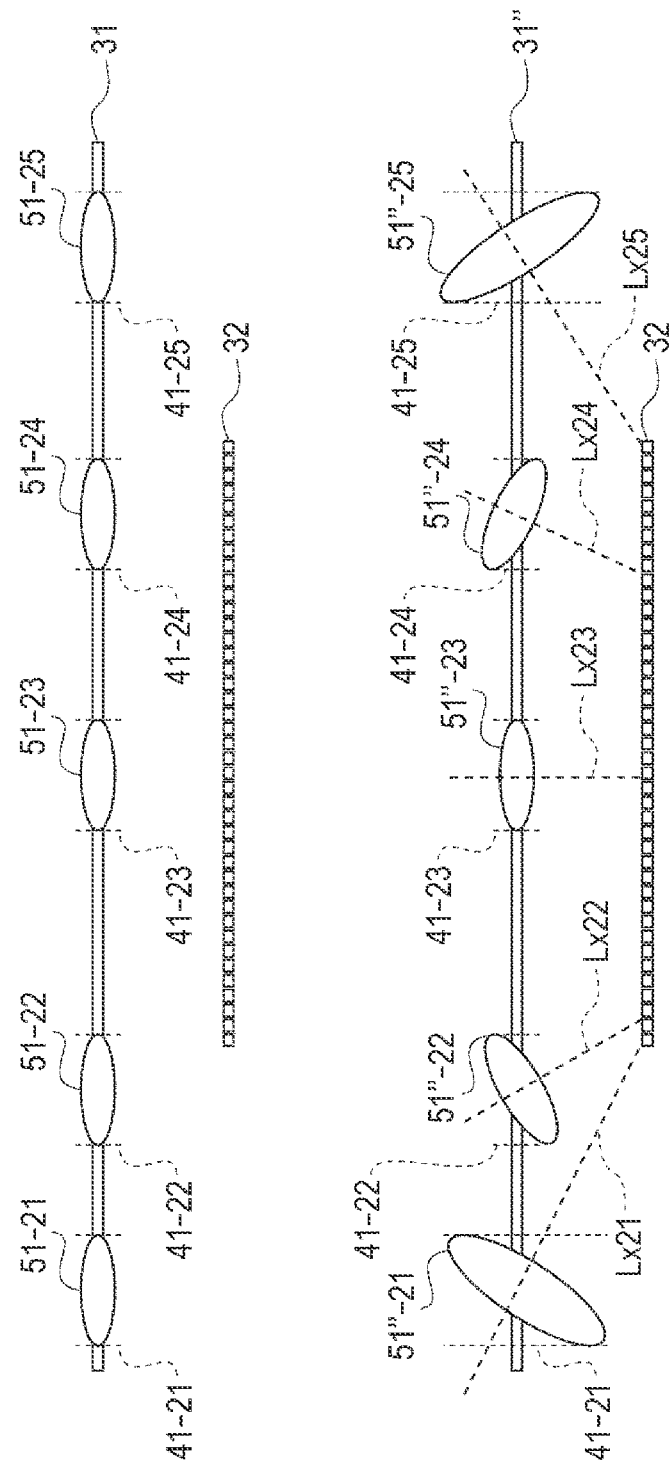
FIG. 14 is a diagram for explaining a first modification of the mask.

That is, as indicated by a mask 31" in the lower portion of FIG. 14, for example, lenses may be arranged so that a lens 51" closer to an edge portion has a larger angle with respect to the optical axis direction and a larger diameter.

Note that the upper portion of FIG. 14 shows a mask 31 in which lenses 51-21 to 51-25 before adjustment are disposed, while the lower portion shows the mask 31" after adjustment and an example in which lenses 51"-21 to 51"-25 are disposed such that a lens closer to an edge portion of the mask 31" has a larger angle with respect to the optical axis direction and has a larger diameter.

That is, in the mask 31" in FIG. 14, the optical axis directions of the respective lenses 51"-21 to 51"-25 are inclined and arranged so that the differences from the respective LFOV central directions Lx21 to Lx25 are minimized, or the respective optical axis directions are substantially aligned with the LFOV central directions Lx21 to Lx25.

Meanwhile, in the mask 31 in FIG. 14, the maximum angle (the initial local field of view ILFOV) with respect to the optical axis becomes larger as the lens 51 has a larger local field of view LFOV and is closer to the center of the mask 31. Therefore, the influence of the aberration becomes larger.

On the other hand, at a lens 51 that has a smaller local field of view LFOV and is closer to an edge portion away from the center of the mask 31, only light in the vicinity of the optical axis is effective, and accordingly, the lens 51 is hardly affected by aberration.

Further, a lens having a larger diameter can normally receive a larger amount of incident light, but the influence of aberration is larger.

Therefore, as indicated by the mask 31" in the lower portion of FIG. 14, a lens 51 that is closer to an edge portion away from the center position of the mask 31", has a smaller local field of view LFOV, and is hardly affected by aberration may have a larger diameter.

As the mask 31" shown in the lower portion of FIG. 14 is formed, it is possible to obtain an image with a high signal-to-noise ratio (S/N) by reducing the decrease in the peripheral light amount and the influence of aberration that depend on the distance from the center of the optical axis, and increasing the amount of incident light.

2-2. Second Modification

Although an example in which the lenses 51 are used as the light condensing elements has been described above, the light condensing elements may be other than the lenses 51, and may be Fresnel zone plates (FZPs), for example.

That is, among the FZPs, the shapes of the FZPs are varied so that optically optimum focusing can be achieved like the lenses 51 having optical axes inclined.

More specifically, as shown in the left portion of FIG. 15, the shapes of the FZPs are varied so that the direction in which focusing is achieved (the direction will be hereinafter also referred to as the focus direction) is aligned with the LFOV central direction, for example. In this manner, it is possible to obtain a structure in which the optimum focusing can be achieved within the range of the effective local field of view LFOV, as in the case with the lenses.

Figure 15:
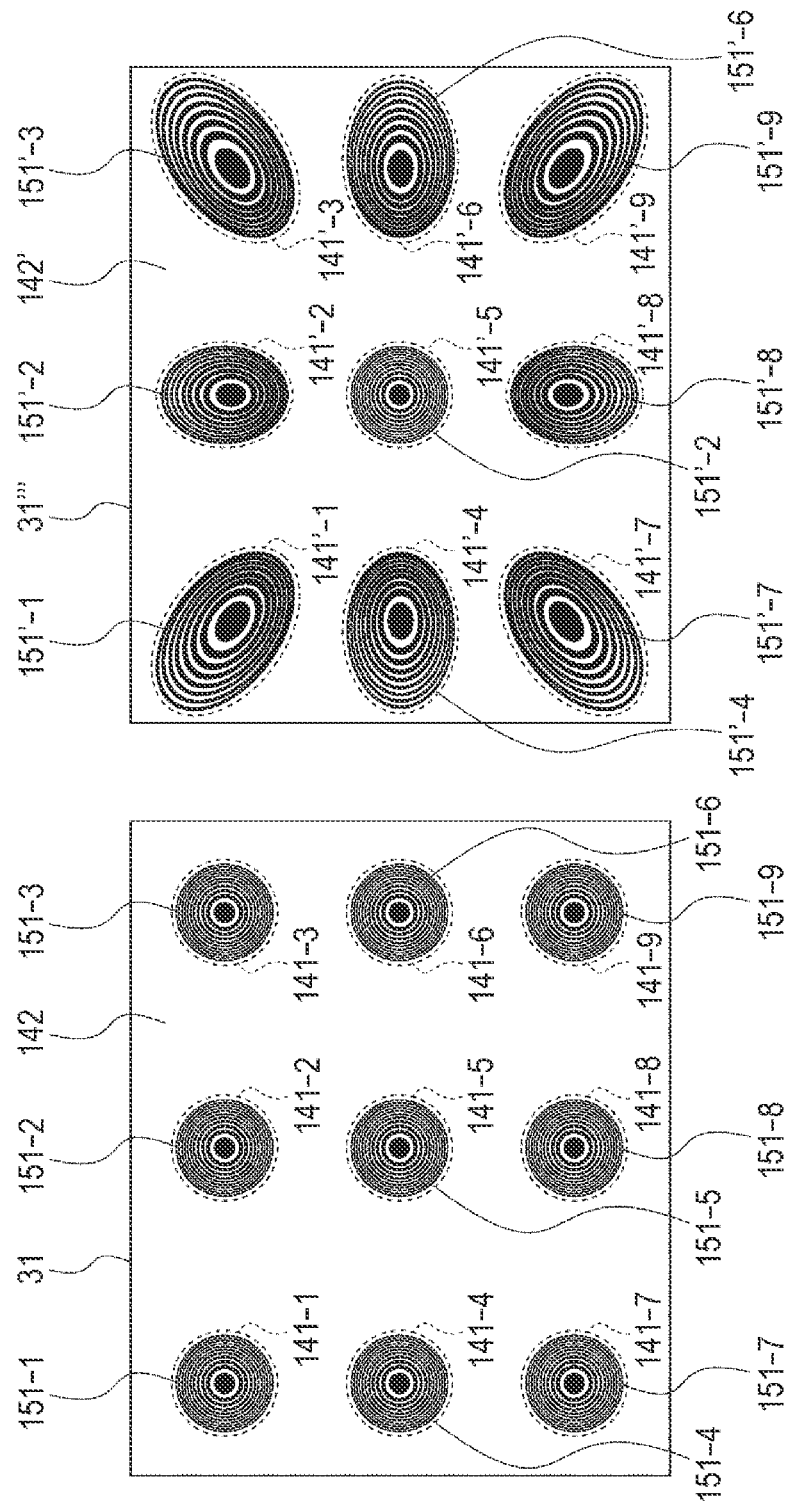
FIG. 15 is a diagram for explaining a second modification of the mask.

That is, the left portion of FIG. 15 shows the mask 31 before adjustment in which conventional FZPs 151-1 to 151-9 are disposed in transmission regions 141-1 to 141-9.

On the other hand, the right portion of FIG. 15 shows a mask 31''' in which the shapes of FZPs 151'-1 to 151'-9 are varied so that the focus direction is aligned with the LFOV central direction.

That is, as indicated by the mask 31''' in the right portion of FIG. 15, the FZPs 151'-1 to 151'-9 are formed by varying the respective center positions and the aspect ratios of the circles forming the respective FZPs 151'-1 to 151'-9, as opposed to the FZPs 151-1 to 151-9 in the mask 31 in the left portion of FIG. 15.

In this arrangement, the closer to an edge portion of the mask 31''', the narrower the angle range required to reconstruct an image. Therefore, the widths, the intervals, and the shapes in the grid forming the FZPs 151' vary.

Further, in a case where the FZPs 151' are used in place of the lenses 51, as the local field of view LFOV becomes smaller, the number of zones (the number of rings) is increased, and the diameters of the FZPs 151' are made larger. Thus, it is possible to achieve the effect to reduce the decrease in the peripheral light amount and the influence of aberration as in the case with the lenses 51.

Note that, regarding a specific method for forming FZPs, see U.S. Pat. No. 7,502,178.

3. Second Embodiment of an Imaging Device Manufacturing Apparatus According to the Present Disclosure As described above, light condensing elements such as the lenses 51 or the FZPs 151 constituting the mask 31 receive smaller amounts of incident light and are more affected by aberration at longer distances from the optical axis, which is not preferable.

Also, the local field of view LFOV is larger in a light condensing element at the center of the mask 31 than in a light condensing element near an edge portion of the mask 31. That is, a light condensing element closer to the center of the mask 31 is more likely to be affected by a decrease in the amount of light and aberration.

Therefore, the layout may be adjusted so as to move the light condensing elements away from the center of the mask 31 as much as possible, to reduce the influence of the light amount decrease and the aberration.

Figure 16:
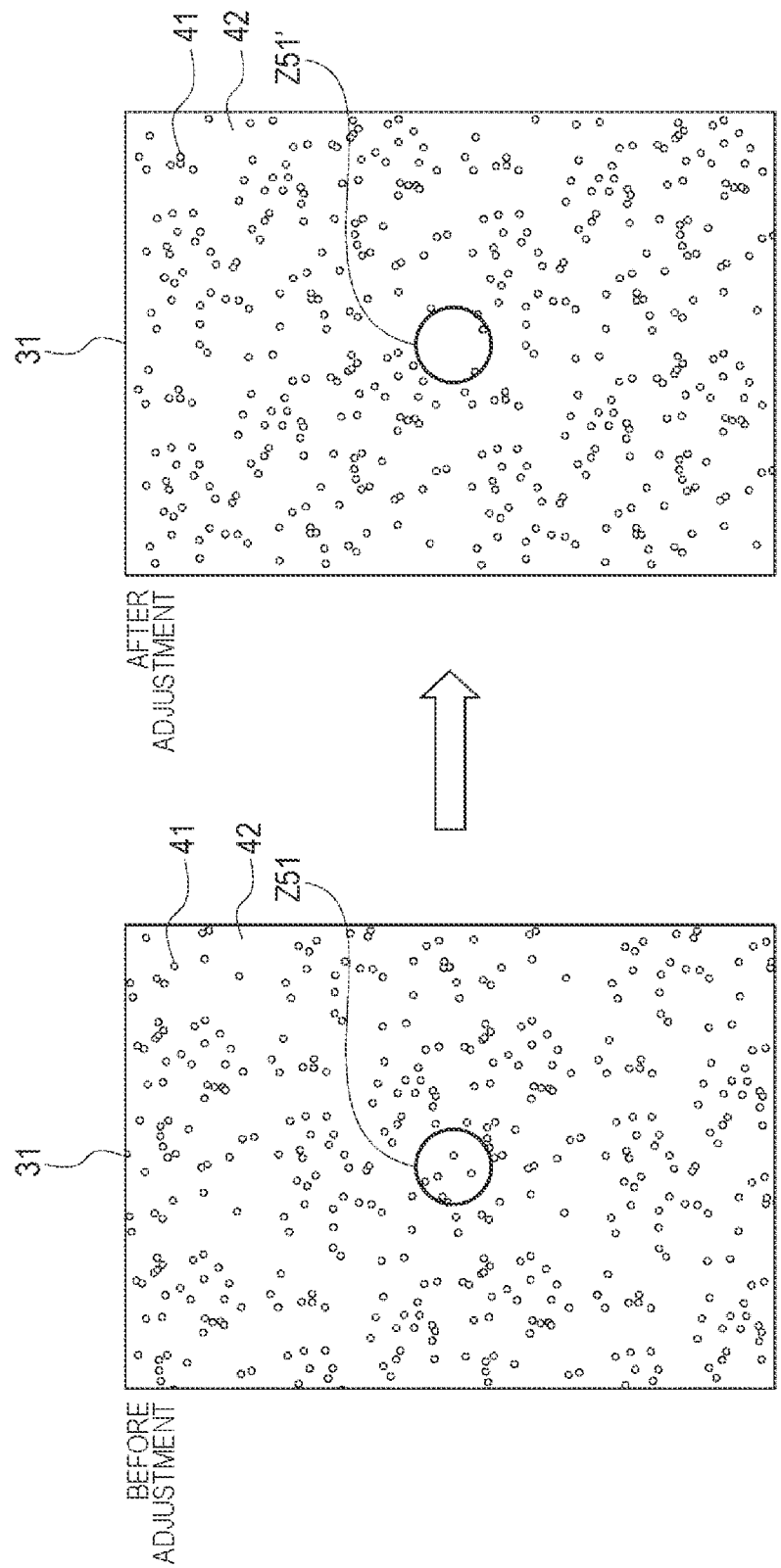
FIG. 16 is a diagram for explaining an example of a mask in which lenses are not formed within a predetermined range from the center of the mask.

More specifically, the layout of the light condensing elements is designed on the condition that image reconstruction is possible, and, as for a mask 31 in the Singer URA pattern as shown in the left portion of FIG. 16, for example, adjustment may be performed so that the transmission regions 41 are rearranged as in the mask 31 shown in the right portion of FIG. 16 while the condition for the pattern in the left portion of FIG. 16 is satisfied.

That is, approximately seven transmission regions 41 are disposed in a region Z51 in the vicinity of the center of the mask 31 in the left portion of FIG. 16. In the mask 31 shown in the right portion of FIG. 16, however, the transmission regions 41 are rearranged at positions away from the range in the vicinity of the center of the mask 31, and only approximately two transmission regions 41 are disposed in a region Z51' that is located in the vicinity of the center and corresponds to the region Z51.

As described above, the transmission regions 41 of the mask 31 in the left portion of FIG. 16 are rearranged as in the mask 31 shown in the right portion of FIG. 16, so that the transmission regions 41 are not disposed in a range within a predetermined distance from the vicinity of the center of the mask 31. Thus, it is possible to reduce the influence of a light amount decrease and aberration occurring in the lenses 51 arranged in the vicinity of the center of the mask 31.

Imaging Device Manufacturing Apparatus According to the Second Embodiment

Next, an example configuration of the second embodiment of an apparatus that manufactures the imaging device 11 including the mask 31 in which the lenses 51 are not disposed in the vicinity of the center of the mask 31 as described above, and further, the installation directions of the lenses 51 are adjusted is described with reference to FIG. 17.

Figure 17:
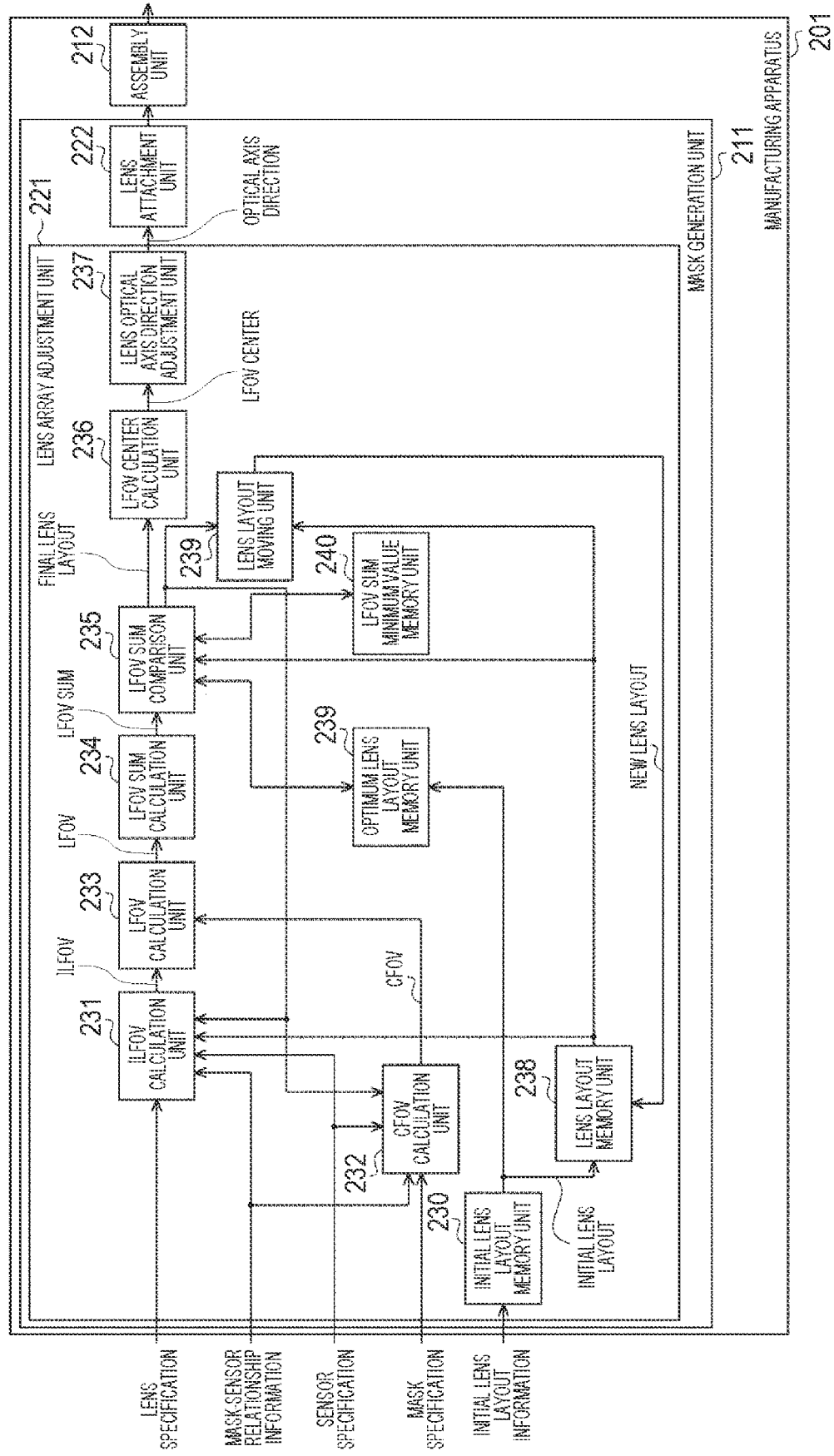
FIG. 17 is a diagram for explaining an example configuration of a second embodiment of an imaging device manufacturing apparatus according to the present disclosure.

A manufacturing apparatus 201 in FIG. 17 includes a mask generation unit 211 that generates the mask 31, and an assembly unit 212 that assembles the imaging device 11 by attaching the mask 31 generated by the mask generation unit 211.

The mask generation unit 211 basically has functions similar to those of the mask generation unit 111 shown in FIG. 12. The mask generation unit 211 forms the transmission regions 41 and the non-transmission region 42 in the mask 31, and disposes the lenses 51 in the formed transmission regions 41, to generate the mask 31 and output the mask 31 to the assembly unit 212. In doing so, the mask generation unit 211 disposes the transmission regions 41 (the lenses 51) in the mask 31 not at positions within a predetermined distance from the center position of the mask 31, and thus, reduces the influence of a light amount decrease and aberration occurring in the lenses 51 disposed near the center of the mask 31. With this arrangement, the image quality of the final image to be reconstructed can be enhanced.

The assembly unit 212 has a configuration similar to that of the assembly unit 112 shown in FIG. 12. The assembly unit 212 attaches the mask 31 supplied from the mask generation unit 211, the imaging element 32, the reconstruction unit 33, and the output unit 34 to one another, and thus, assembles and outputs the imaging device 11 shown in FIG. 1.

(Mask Generation Unit in FIG. 17)

More specifically, the mask generation unit 211 includes a lens array adjustment unit 221 and a lens attachment unit 222.

On the basis of the lens specification, lens layout information, mask-sensor relationship information, the sensor specification, the mask specification, and initial lens layout information, the lens array adjustment unit 221 optimally disposes transmission regions 41 at positions a predetermined distance away from the vicinity of the center of the mask 31. The lens array adjustment unit 221 also outputs, to the lens attachment unit 222, final lens layout that is layout information about the transmission regions 41, and optical axis direction information about each of the lenses 51 to be disposed in the respective transmission regions 41.

The lens attachment unit 222 forms the transmission regions 41 and the non-transmission region 42 on the basis of the final lens layout determined in an optimized state supplied from the lens array adjustment unit 221, and further adjusts the optical axes of the lenses 51 on the basis of information about the adjusted lens optical axis directions supplied from the lens array adjustment unit 221. The lens attachment unit 222 then disposes the lenses 51 in the respective transmission regions 41, completes the mask, and outputs the mask 31 to the assembly unit 112.

(Lens Array Adjustment Unit in FIG. 17)

Further, the lens array adjustment unit 221 includes an initial lens layout memory unit 230, an ILFOV calculation unit 231, a CFOV calculation unit 232, a LFOV calculation unit 233, a LFOV sum calculation unit 234, a LFOV sum comparison unit 235, a LFOV center calculation unit 236, a lens optical axis direction adjustment unit 237, a lens layout memory unit 238, an optimum lens layout memory unit 239, a LFOV sum minimum value memory unit 240, and a lens layout moving unit 241.

Note that the ILFOV calculation unit 231, the CFOV calculation unit 232, the LFOV calculation unit 233, the LFOV center calculation unit 236, and the lens optical axis direction adjustment unit 237 are similar to the ILFOV calculation unit 131, the CFOV calculation unit 132, the LFOV calculation unit 133, the LFOV center calculation unit 134, and the lens optical axis direction adjustment unit 135 shown in FIG. 12, respectively, and therefore, explanation of them is not made herein.

The initial lens layout memory unit 230 stores beforehand initial lens layout information that is layout information about the transmission regions 41 in which the lenses 51 are to be disposed in the mask 31, and supplies and stores the initial lens layout information into the lens layout memory unit 238 and the optimum lens layout memory unit 239 at the beginning of the process.

The LFOV sum calculation unit 234 calculates a LFOV sum that is the total sum of the local fields of view LFOV of the respective lenses 51 calculated by the LFOV calculation unit 233, and outputs the LFOV sum, together with information about the local fields of view LFOV of the respective lenses 51, to the LFOV sum comparison unit 235.

The LFOV sum comparison unit 235 compares the LFOV sum that is the total sum of the local fields of view LFOV of the respective lenses 51 supplied from the LFOV sum calculation unit 234 with a minimum LFOV sum value stored in the LFOV sum minimum value memory unit 240. Note that the LFOV sum minimum value memory unit 240 stores a relatively large value as the initial value.

Further, in a case where the LFOV sum, which is the total sum of the local fields of view LFOV of the respective lenses 51 supplied from the LFOV sum calculation unit 234, is smaller than the minimum LFOV sum value stored in the LFOV sum minimum value memory unit 240, the LFOV sum comparison unit 235 determines that an image with higher image quality than the current layout of the lenses 51 in the mask 31 can be reconstructed, and controls and instructs the lens layout moving unit 241 to rearrange the transmission regions 41 so that the transmission regions 41, or the lenses 51, are not disposed within the range of a predetermined distance from the center position of the mask 31.

At this point of time, on the basis of the lens layout stored in the lens layout memory unit 238, the lens layout moving unit 241 generates a new lens layout (or a layout of the transmission regions 41 in which the lenses 51 can be disposed) so that the lenses 51 are not disposed within the range of a predetermined distance from the center of the mask 31, while satisfying the conditions for formation of the Singer URA pattern in which the final image can be reconstructed. The new lens layout is then written over the lens layout memory unit 238.

The LFOV sum comparison unit 235 also regards the LFOV sum at this point of time as the minimum LFOV sum value, and writes the LFOV sum together with the local fields of view LFOV of the respective lenses 51 over the LFOV sum minimum value memory unit 240.

On the basis of the new lens layout newly stored into the lens layout memory unit 238, the ILFOV calculation unit 231 and the CFOV calculation unit 232 calculate the initial local field of view ILFOV and the camera field of view CFOV.

As described above, as long as the LFOV sum, which is the total sum of the local fields of view LFOV of the respective lenses 51 supplied from the LFOV sum calculation unit 234, is determined to be smaller than the minimum LFOV sum value stored in the LFOV sum minimum value memory unit 240, a process similar to the above is repeated, while the distance from the center position of the mask 31 in which the transmission regions 41 (the lenses 51) is not to be disposed is increased.

That is, the local field of view LFOV of each lens 51 has a larger value at a position closer to the center position of the mask 31. Therefore, when the LFOV sum, which is the total sum of the local fields of view LFOV of the respective lenses 51, is large, many transmission regions 41 (lenses 51) might be disposed near the center of the mask 31, and the image quality of the final image after reconstruction might become lower than a predetermined state.

Accordingly, in a case where the LFOV sum is smaller than the minimum LFOV sum value, it is considered that there is a possibility that the image quality of the final image after reconstruction can be further enhanced through rearrangement of the transmission regions 41 (lenses 51) in conjunction with widening of the range of a predetermined distance from the center position in which any transmission region 41 (lens 51) is not to be disposed. In that case, the LFOV sum comparison unit 235 controls the lens layout moving unit 241 to repeat rearrangement of the transmission regions 41 (lenses 51) while gradually widening the range within the predetermined distance from the center position in which any transmission region 41 (lens 51) is not to be disposed.

Further, in a case where it is determined that the LFOV sum is larger than the minimum LFOV sum value, and that the image quality after reconstruction is lower than that in a case where a mask 31 having a predetermined condition is used, the LFOV sum comparison unit 235 determines that the lens layout information stored into the optimum lens layout memory unit 239 through the immediately preceding process is information about an optimized lens layout, reads the lens layout information as the final lens layout information, and outputs the final lens layout information, together with information about the local fields of view LFOV of the respective lenses 51, to the LFOV center calculation unit 236.

In other words, it is safe to say that the LFOV sum comparison unit 235 adjusts the layout of the transmission regions 41 (lenses 51), on the basis of an evaluation function formed with the LFOV sum.

That is, the LFOV sum comparison unit 235 controls the lens layout moving unit 241 until the evaluation function formed with the LFOV sum is minimized, and obtains the LFOV sum as the evaluation function, while widening the range of a predetermined distance from the center of the mask 31 in which the lenses 51 are not to be disposed, and repeatedly generating a new lens layout (a layout of the transmission regions 41 in which the lenses 51 can be disposed).

Further, when the evaluation function formed with the LFOV sum starts increasing, it is determined that the evaluation function, which is the LFOV sum in the immediately preceding lens layout (a layout of the transmission regions 41 in which the lenses 51 can be disposed), has the minimum value, and the immediately preceding lens layout is output as the final lens layout.

The LFOV center calculation unit 236 calculates the LFOV central direction of each lens 51 when the lenses 51 are disposed in the transmission regions 41 on the basis of the final lens layout information, and outputs the LFOV central direction to the lens optical axis direction adjustment unit 237.

The lens optical axis direction adjustment unit 237 adjusts the optical axis direction of each lens 51 on the basis of the LFOV central direction of each lens 51 supplied from the LFOV center calculation unit 236, and supplies information about the adjusted optical axis direction of each lens 51 to the lens attachment unit 222.

<Imaging Device Manufacturing Process to be Performed by the Manufacturing Apparatus Shown in FIG. 17>

Figure 18:
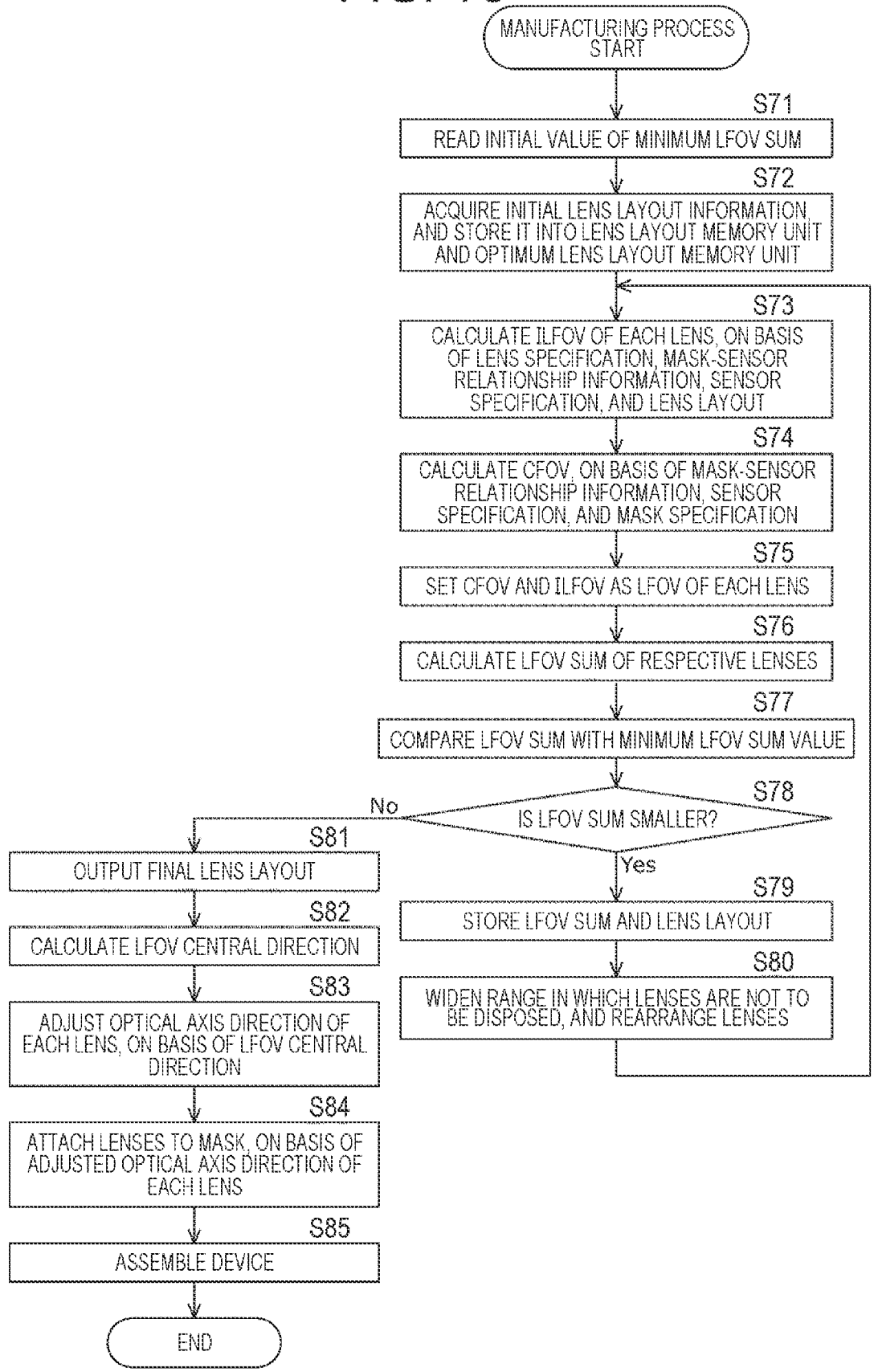
FIG. 18 is a flowchart for explaining a manufacturing process to be performed by the imaging device manufacturing apparatus shown in FIG. 17.

Next, the process to be performed by the manufacturing apparatus shown in FIG. 17 to manufacture the imaging device is described with reference to a flowchart shown in FIG. 18.

In step S71, the LFOV sum comparison unit 235 inputs the minimum LFOV sum value that is a greater value than a predetermined value to the LFOV sum minimum value memory unit 240.

In step S72, the initial lens layout memory unit 230 stores the initial lens layout information stored beforehand therein, into the lens layout memory unit 238 and the optimum lens layout memory unit 239.

In step S73, the ILFOV calculation unit 231 calculates the initial local field of view ILFOV of each lens 51 on the basis of the lens specification, mask-sensor relationship information, the sensor specification, and the lens layout, and outputs the initial local field of view ILFOV to the LFOV calculation unit 233.

In step S74, the CFOV calculation unit 232 calculates the camera field of view CFOV on the basis of the mask-sensor relationship information, the sensor specification, and the mask specification, and outputs the camera field of view CFOV to the LFOV calculation unit 233.

In step S75, the LFOV calculation unit 233 calculates the local field of view LFOV of each lens 51 on the basis of the initial local field of view ILFOV of each lens 51 supplied from the ILFOV calculation unit 231 and the camera field of view CFOV supplied from the CFOV calculation unit 232, and outputs the local field of view LFOV of each lens 51 to the LFOV sum calculation unit 234.

In step S76, the LFOV sum calculation unit 234 calculates the total sum of the local fields of view LFOV of the respective lenses 51, and outputs an evaluation function formed with the LFOV sum, together with the local fields of view LFOV of the respective lenses 51, to the LFOV sum comparison unit 235.

In step S77, the LFOV sum comparison unit 235 compares the evaluation function formed with the LFOV sum supplied from the LFOV sum calculation unit 234 with the minimum LFOV sum value stored in the LFOV sum minimum value memory unit 240.

In step S78, the LFOV sum comparison unit 235 determines whether or not the evaluation function formed with the LFOV sum supplied from the LFOV sum calculation unit 234 is smaller than the minimum LFOV sum value stored in the LFOV sum minimum value memory unit 240.

If it is determined in step S78 that the evaluation function formed with the LFOV sum supplied from the LFOV sum calculation unit 234 is smaller than the minimum LFOV sum value stored in the LFOV sum minimum value memory unit 240, the process moves on to step S79.

In step S79, the LFOV sum comparison unit 235 determines that an image with higher image quality than the current layout of the lenses 51 in the mask 31 can be reconstructed, determines the current lens layout to be the optimum lens layout, and stores the current lens layout into the optimum lens layout memory unit 239. Also, the LFOV sum comparison unit 235 determines that the evaluation function formed with the LFOV sum at this point of time is the minimum LFOV sum value, and writes the evaluation function, together with the local fields of view LFOV of the respective lenses 51, over the LFOV sum minimum value memory unit 240.

In step S80, the LFOV sum comparison unit 235 controls and instructs the lens layout moving unit 241 to adjust the range in which the lenses 51 (transmission regions 41) are not to be disposed to a range that extends from the center position of the mask 31 by a predetermined distance, and rearrange the transmission regions 41.

Note that, in the initial process, the range in which the lenses 51 are not to be disposed is not set, and therefore, the range of a predetermined distance from the center position of the mask 31 in which the lenses 51 (transmission regions 41) are not to be disposed is set as the initial value.

In response to this instruction, the lens layout moving unit 241 sets the range in which the lenses 51 are not to be disposed at the predetermined distance from the center of the mask 31 while satisfying the conditions for the Singer URA pattern, on the basis of the lens layout stored in the lens layout memory unit 238. The lens layout moving unit 241 then generates a new lens layout, and writes the new lens layout over the lens layout memory unit 238.

That is, the range of the predetermined distance from the center of the mask 31 in which the lenses 51 are not to be disposed is designed to be gradually widened when the same process is repeated, and a new lens layout is repeatedly set.

The process then returns to step S73, and the processes thereafter are repeated.

That is, the processes in steps S73 to S80 are repeated, until it is determined in step S78 that the evaluation function formed with the LFOV sum supplied from the LFOV sum calculation unit 234 is not smaller than the minimum LFOV sum value stored in the LFOV sum minimum value memory unit 240.

Here, the fact that the evaluation function that is the LFOV sum obtained from the mask 31 including the lenses 51 disposed in the transmission regions 41 in the current state is smaller than the minimum LFOV sum value means that an image with higher image quality can be reconstructed with the current lens layout in the mask 31 than with the layout of the lenses 51 in the mask 31 obtained in the immediately preceding process, and that there is a possibility that the evaluation function that is the LFOV sum can be made even smaller by further rearrangement.

Therefore, in such a case, the following process is repeated: while the range of the predetermined distance from the center of the mask 31 in which the lenses 51 are not to be disposed is gradually widened, the transmission regions 41 (lenses 51) are rearranged, and the evaluation function formed with the LFOV sum is obtained and is compared with the minimum LFOV sum value.

That is, until it is determined that the evaluation function formed with the LFOV sum supplied from the LFOV sum calculation unit 234 is not smaller (or is larger) than the minimum LFOV sum value stored in the LFOV sum minimum value memory unit 240 (or it is determined that the evaluation function has started increasing), and it is determined that an image with higher image quality can be reconstructed with the immediately preceding layout of the lenses 51 in the mask 31 than with the current layout of the lenses 51 in the mask 31, the lenses 51 are repeatedly rearranged while the range of the predetermined distance from the center of the mask 31 in which the lenses 51 are not to be disposed is gradually widened.

If it is determined in step S78 that the evaluation function formed with the LFOV sum supplied from the LFOV sum calculation unit 234 is not smaller (or is larger) than the minimum LFOV sum value stored in the LFOV sum minimum value memory unit 240, or if it is determined that an image with higher image quality can be reconstructed with the immediately preceding layout of the lenses 51 in the mask 31, the process then moves on to step S81.

In step S81, the LFOV sum comparison unit 235 reads the final lens layout that is the immediately preceding layout information about the lenses 51 in the mask 31 and is stored in the optimum lens layout memory unit 239, reads the corresponding local fields of view LFOV of the respective lenses 51 stored therein, and outputs the final lens layout and the local fields of view LFOV to the LFOV center calculation unit 236.

In step S82, the LFOV center calculation unit 236 calculates the LFOV central directions of the respective lenses 51 on the basis of the final lens layout and the local fields of view LFOV of the respective lenses 51 supplied from the LFOV sum comparison unit 235, and outputs the LFOV central directions to the lens optical axis direction adjustment unit 237.

That is, here, the LFOV central directions of the respective lenses 51 disposed in the respective transmission regions 41 arranged in an optimum state in the mask 31 are calculated.

In step S83, the lens optical axis direction adjustment unit 237 calculates an evaluation function that is formed with the differences between the LFOV central directions of the respective lenses 51 supplied from the LFOV center calculation unit 236 and the optical axis directions of the respective lenses 51, and adjusts the optical axis directions of the respective lenses 51 so as to minimize the evaluation function.

That is, in practice, the lens optical axis direction adjustment unit 237 adjusts the optical axis directions of the respective lenses 51 so that the LFOV central direction of each lens 51 supplied from the LFOV center calculation unit 236 substantially matches the optical axis direction of the lens 51.

The lens optical axis direction adjustment unit 237 then outputs information about the optical axis direction of each lens 51 adjusted to minimize the evaluation function, to the lens attachment unit 222.

In step S84, the lens attachment unit 222 forms the transmission regions 41 at the positions corresponding to the final lens layout. The lens attachment unit 222 then adjusts the optical axis of each lens 51 on the basis of the information about the adjusted optical axis direction of each lens 51 supplied from the lens optical axis direction adjustment unit 237 of the lens array adjustment unit 221, attaches the lenses 51 to the respective transmission regions 41, completes the mask 31, and outputs the mask 31 to the assembly unit 212.

In step S85, the assembly unit 212 attaches the mask 31 having the respective lenses 51 disposed in the transmission regions 41 in the optimum state, the imaging element 32, the reconstruction unit 33, and the output unit 34 to one another, the optical axes of the respective lenses 51 being adjusted to minimize the respective evaluation functions. In this manner, the imaging device 11 shown in FIG. 1 is completed.

Through the above processes, the lenses 51 disposed in the transmission regions 41 arranged in the optimized state in which the transmission regions 41 in which the lenses 51 are to be disposed are not formed within a predetermined distance from the center position of the mask 31 can minimize the influence of a peripheral light amount decrease and aberration that depend on the distance from each optical axis center.

As a result, the light condensing elements forming the transmission regions in the mask to be used in a lensless camera can be appropriately adjusted, and the image quality of the reconstructed image based on the observation values projected onto the imaging element can be enhanced.

Note that, in the example described above, the transmission regions 41 are rearranged so as not to be formed within a predetermined range from the center position of the mask 31, and the optical axis is adjusted for each lens 51 so as to minimize the difference from the LFOV central direction. However, instead of the lenses 51, FZPs may be disposed in the transmission regions 41.

Further, the adjustment of the optical axes of the lenses 51 to minimize the differences from the LFOV central direction may be omitted, and only the process of rearranging the transmission regions 41 outside the predetermined range from the center position of the mask 31 may be performed. In this manner, the image quality of the final image to be reconstructed can also be made higher than that in a case where some transmission regions 41 are included in the vicinity of the center position of the mask 31.

4. Examples in which Processes are Carried Out by Software

Meanwhile, the series of processes described above can be performed by hardware, but can also be performed by software. In a case where the series of processes are performed by software, the program that forms the software can be installed in a computer incorporated into special-purpose hardware, or can be installed from a recording medium into a general-purpose computer or the like that can execute various kinds of functions by installing various kinds of programs, for example.

Figure 19:
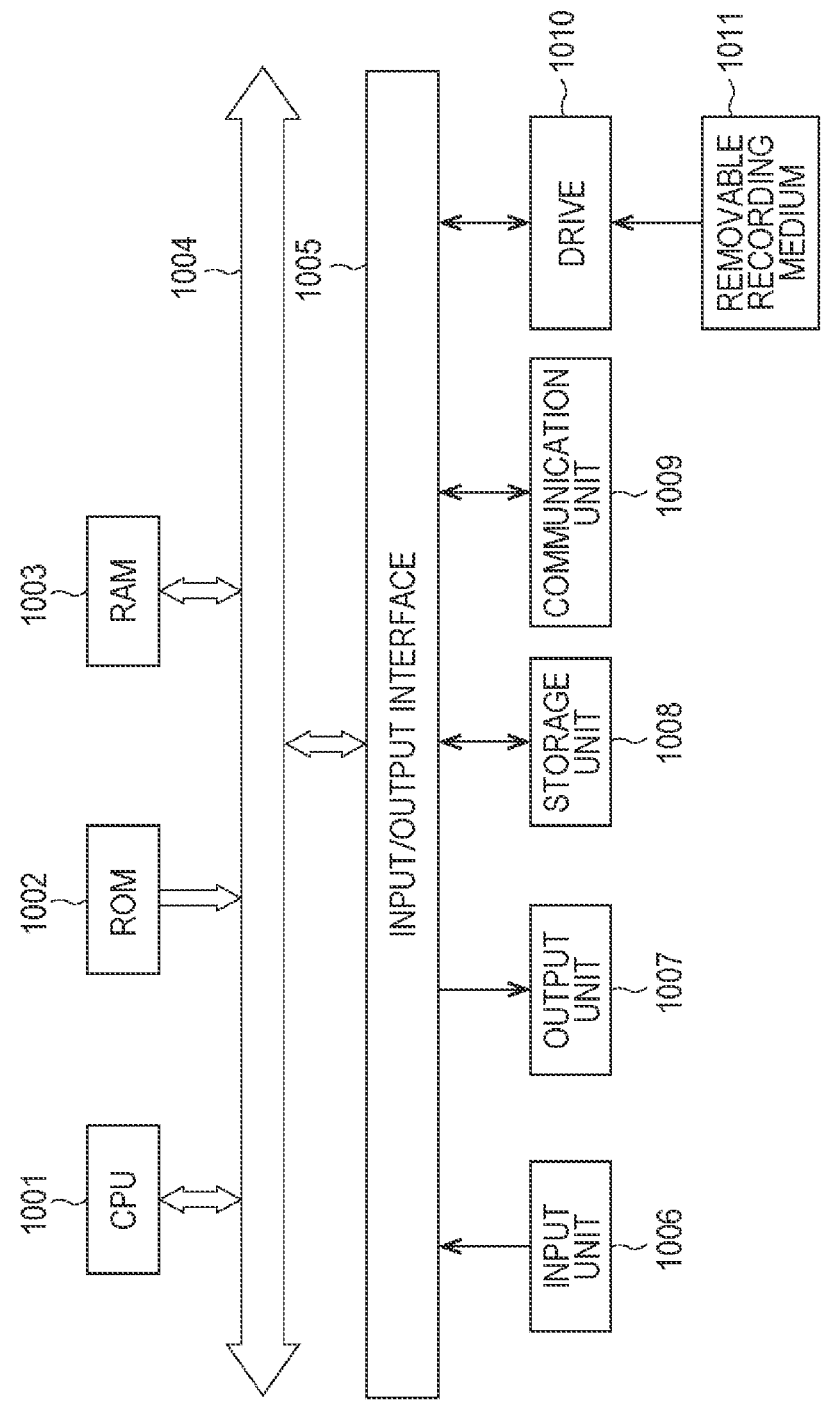
FIG. 19 is a diagram for explaining an example configuration of a general-purpose personal computer.

FIG. 19 shows an example configuration of a general-purpose computer. This personal computer includes a central processing unit (CPU) 1001. An input/output interface 1005 is connected to the CPU 1001 via a bus 1004. A read-only memory (ROM) 1002 and a random access memory (RAM) 1003 are connected to the bus 1004.

An input unit 1006, an output unit 1007, a storage unit 1008, and a communication unit 1009 are connected to the input/output interface 1005. The input unit 1006 is formed with an input device such as a keyboard or a mouse through which a user inputs an operation command, the output unit 1007 outputs an image of a process operating screen or a processing result to a display device, the storage unit 1008 is formed with a hard disk drive or the like that stores programs and various kinds of data, and the communication unit 1009 is formed with a local area network (LAN) adapter or the like and performs a communication process via a network that is typically the Internet. A drive 1010 is also connected to the input/output interface 1005. The drive 1010 performs data reading and writing on a removable storage medium 1011, such as a magnetic disk (such as a flexible disk), an optical disk (such as a Compact Disc-Read-Only Memory (CD-ROM) or a Digital Versatile Disc (DVD)), a magnetooptical disk (such as Mini Disc (MD)), or a semiconductor memory.

The CPU 1001 performs various processes in accordance with a program that is stored in the ROM 1002, or a program that is read from the removable storage medium 1011, which is a magnetic disk, an optical disk, a magnetooptical disk, a semiconductor memory, or the like, is installed into the storage unit 1008, and is loaded from the storage unit 1008 into the RAM 1003. The RAM 1003 also stores data and the like necessary for the CPU 1001 to perform various processes, as appropriate.

In the computer having the above described configuration, for example, the CPU 1001 loads a program stored in the storage unit 1008 into the RAM 1003 via the input/output interface 1005 and the bus 1004, and executes the program, so that the above described series of processes are performed.

The program to be executed by the computer (the CPU 1001) can be recorded on the removable storage medium 1011 as a packaged medium or the like, for example, and be then provided. Alternatively, the program can be provided via a wired or wireless transmission medium, such as a local area network, the Internet, or digital satellite broadcasting.

In the computer, the program can be installed into the storage unit 1008 via the input/output interface 1005 when the removable storage medium 1011 is mounted on the drive 1010. Also, the program can be received by the communication unit 1009 via a wired or wireless transmission medium, and be installed into the storage unit 1008. Alternatively, the program can be installed beforehand into the ROM 1002 or the storage unit 1008.

Note that the program to be executed by the computer may be a program for performing processes in chronological order in accordance with the sequence described in this specification, or may be a program for performing processes in parallel or performing a process when necessary, such as when there is a call.

Note that the CPU 1001 in FIG. 19 achieves the functions of the lens array adjustment units 121 and 221 shown in FIGS. 12 and 17.

Also, in this specification, a system means an assembly of plurality of components (devices, modules (parts), and the like), and not all the components need to be provided in the same housing. In view of this, a plurality of devices that are housed in different housings and are connected to one another via a network forms a system, and one device having a plurality of modules housed in one housing is also a system.

Note that embodiments of the present disclosure are not limited to the above described embodiments, and various modifications can be made to the embodiments without departing from the scope of the present disclosure.

For example, the present disclosure can be embodied in a cloud computing configuration in which one function is shared among devices via a network, and processing is performed by the plurality of devices cooperating with one another.

Further, the respective steps described with reference to the flowcharts described above can be carried out by one device, or can be shared among a plurality of devices.

Furthermore, in a case where a plurality of processes is included in one step, the plurality of processes included in the one step can be performed by one device, or can be shared among a plurality of devices.

5. Example Applications to Mobile Structures

The technology (the present technology) according to the present disclosure can be applied to various products. For example, the technology according to the present disclosure may be embodied as a device mounted on any type of mobile structure, such as an automobile, an electrical vehicle, a hybrid electrical vehicle, a motorcycle, a bicycle, a personal mobility device, an airplane, a drone, a vessel, or a robot.

Figure 20:
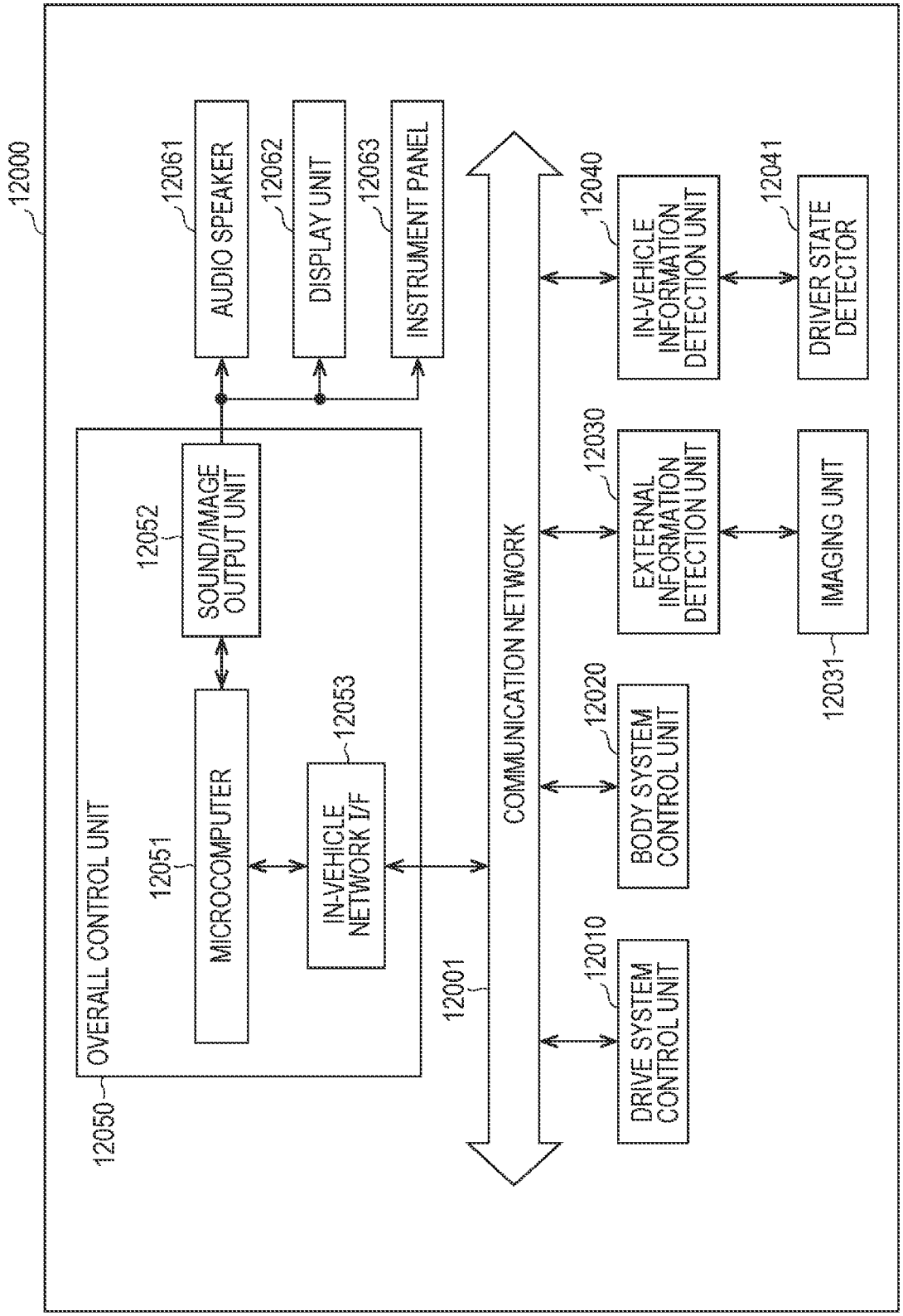
FIG. 20 is a block diagram schematically showing an example configuration of a vehicle control system.

FIG. 20 is a block diagram showing a schematic configuration of a vehicle control system that is an example of a mobile structure control system to which the technology according to the present disclosure can be applied.

A vehicle control system 12000 includes a plurality of electronic control units connected via a communication network 12001. In the example shown in FIG. 20, the vehicle control system 12000 includes a drive system control unit 12010, a body system control unit 12020, an external information detection unit 12030, an in-vehicle information detection unit 12040, and an overall control unit 12050. Further, a microcomputer 12051, a sound/image output unit 12052, and an in-vehicle network interface (I/F) 12053 are shown as the functional components of the overall control unit 12050.

The drive system control unit 12010 controls operations of the devices related to the drive system of the vehicle according to various programs. For example, the drive system control unit 12010 functions as control devices such as a driving force generation device for generating a driving force of the vehicle such as an internal combustion engine or a driving motor, a driving force transmission mechanism for transmitting the driving force to the wheels, a steering mechanism for adjusting the steering angle of the vehicle, and a braking device for generating a braking force of the vehicle.

The body system control unit 12020 controls operations of the various devices mounted on the vehicle body according to various programs. For example, the body system control unit 12020 functions as a keyless entry system, a smart key system, a power window device, or a control device for various lamps such as a headlamp, a backup lamp, a brake lamp, a turn signal lamp, a fog lamp, or the like. In this case, the body system control unit 12020 can receive radio waves transmitted from a portable device that substitutes for a key, or signals from various switches. The body system control unit 12020 receives inputs of these radio waves or signals, and controls the door lock device, the power window device, the lamps, and the like of the vehicle.

The external information detection unit 12030 detects information about the outside of the vehicle equipped with the vehicle control system 12000. For example, an imaging unit 12031 is connected to the external information detection unit 12030. The external information detection unit 12030 causes the imaging unit 12031 to capture an image of the outside of the vehicle, and receives the captured image. On the basis of the received image, the external information detection unit 12030 may perform an object detection process for detecting a person, a vehicle, an obstacle, a sign, characters on the road surface, or the like, or perform a distance detection process.

The imaging unit 12031 is an optical sensor that receives light, and outputs an electrical signal corresponding to the amount of received light. The imaging unit 12031 can output an electrical signal as an image, or output an electrical signal as distance measurement information. Further, the light to be received by the imaging unit 12031 may be visible light, or may be invisible light such as infrared rays.

The in-vehicle information detection unit 12040 detects information about the inside of the vehicle. For example, a driver state detector 12041 that detects the state of the driver is connected to the in-vehicle information detection unit 12040. The driver state detector 12041 includes a camera that captures an image of the driver, for example, and, on the basis of detected information input from the driver state detector 12041, the in-vehicle information detection unit 12040 may calculate the degree of fatigue or the degree of concentration of the driver, or determine whether or not the driver is dozing off.

On the basis of the external/internal information acquired by the external information detection unit 12030 or the in-vehicle information detection unit 12040, the microcomputer 12051 can calculate the control target value of the driving force generation device, the steering mechanism, or the braking device, and output a control command to the drive system control unit 12010. For example, the microcomputer 12051 can perform cooperative control to achieve the functions of an advanced driver assistance system (ADAS), including vehicle collision avoidance or impact mitigation, follow-up running based on the distance between vehicles, vehicle velocity maintenance running, vehicle collision warning, vehicle lane deviation warning, or the like.

Further, the microcomputer 12051 can also perform cooperative control to conduct automatic driving or the like for autonomously running not depending on the operation of the driver, by controlling the driving force generation device, the steering mechanism, the braking device, or the like on the basis of information about the surroundings of the vehicle, the information having being acquired by the external information detection unit 12030 or the in-vehicle information detection unit 12040.

The microcomputer 12051 can also output a control command to the body system control unit 12020, on the basis of the external information acquired by the external information detection unit 12030. For example, the microcomputer 12051 controls the headlamp in accordance with the position of the leading vehicle or the oncoming vehicle detected by the external information detection unit 12030, and performs cooperative control to achieve an anti-glare effect by switching from a high beam to a low beam, or the like.

The sound/image output unit 12052 transmits an audio output signal and/or an image output signal to an output device that is capable of visually or audibly notifying the passenger(s) of the vehicle or the outside of the vehicle of information. In the example shown in FIG. 20, an audio speaker 12061, a display unit 12062, and an instrument panel 12063 are shown as output devices. The display unit 12062 may include an on-board display and/or a head-up display, for example.

Figure 21:
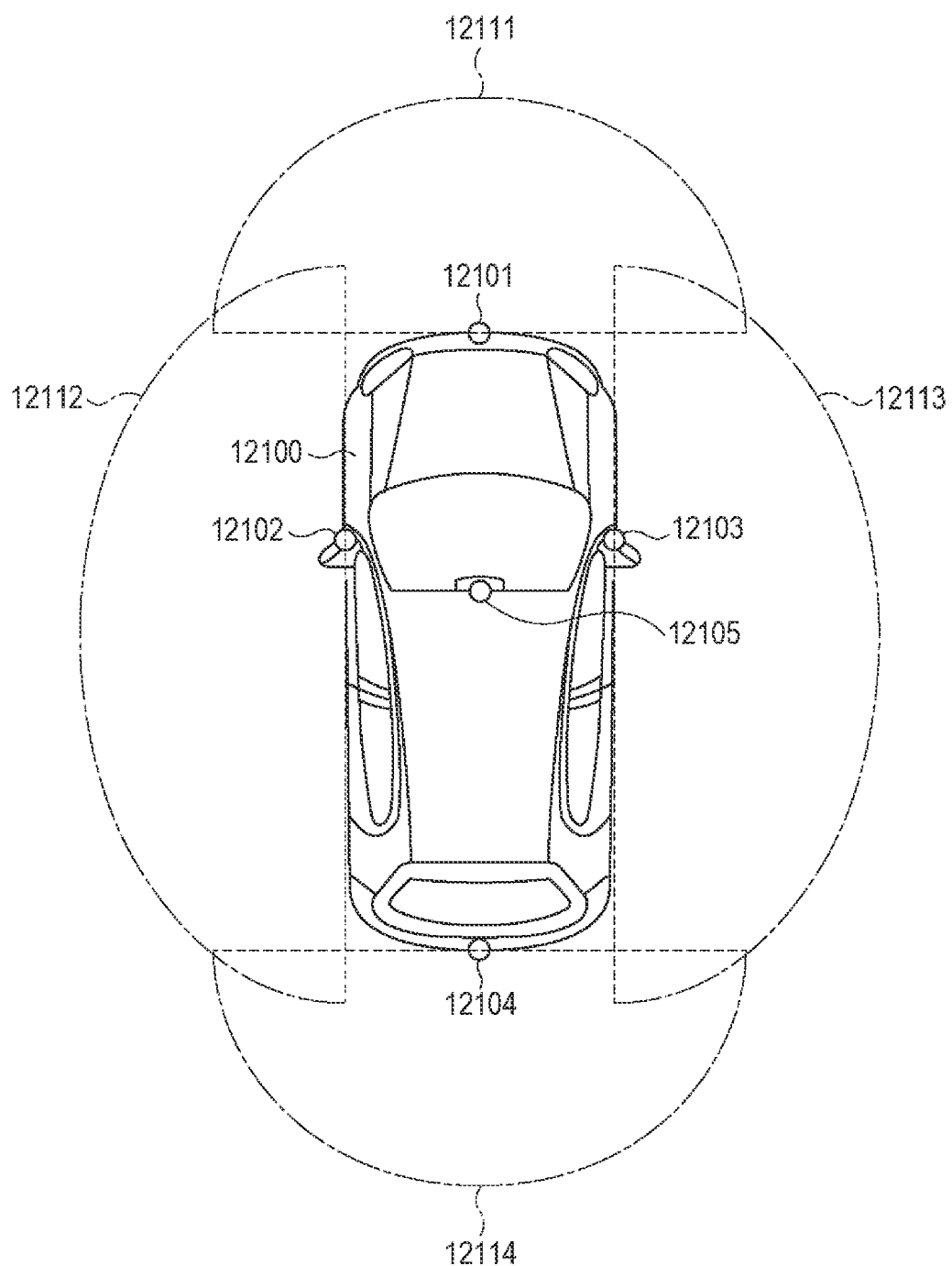
FIG. 21 is an explanatory diagram showing an example of installation positions of external information detectors and imaging units.

FIG. 21 is a diagram showing an example of installation positions of imaging units 12031.

In FIG. 21, a vehicle 12100 includes imaging units 12101, 12102, 12103, 12104, and 12105 as the imaging units 12031.

The imaging units 12101, 12102, 12103, 12104, and 12105 are provided at the following positions: the front end edge of the vehicle 12100, a side mirror, the rear bumper, a rear door, an upper portion of the front windshield inside the vehicle, and the like, for example. The imaging unit 12101 provided on the front end edge and the imaging unit 12105 provided on the upper portion of the front windshield inside the vehicle mainly capture images ahead of the vehicle 12100. The imaging units 12102 and 12103 provided on the side mirrors mainly capture images on the sides of the vehicle 12100. The imaging unit 12104 provided on the rear bumper or a rear door mainly captures images behind the vehicle 12100. The front images acquired by the imaging units 12101 and 12105 are mainly used for detection of a vehicle running in front of the vehicle 12100, a pedestrian, an obstacle, a traffic signal, a traffic sign, a lane, or the like.

Note that FIG. 21 shows an example of the imaging ranges of the imaging units 12101 to 12104. An imaging range 12111 indicates the imaging range of the imaging unit 12101 provided on the front end edge, imaging ranges 12112 and 12113 indicate the imaging ranges of the imaging units 12102 and 12103 provided on the respective side mirrors, and an imaging range 12114 indicates the imaging range of the imaging unit 12104 provided on the rear bumper or a rear door. For example, image data captured by the imaging units 12101 to 12104 are superimposed on one another, so that an overhead image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, on the basis of distance information obtained from the imaging units 12101 to 12104, the microcomputer 12051 calculates the distances to the respective three-dimensional objects within the imaging ranges 12111 to 12114, and temporal changes in the distances (the velocities relative to the vehicle 12100). In this manner, the three-dimensional object that is the closest three-dimensional object in the traveling path of the vehicle 12100 and is traveling at a predetermined velocity (0 km/h or higher, for example) in substantially the same direction as the vehicle 12100 can be extracted as the vehicle running in front of the vehicle 12100. Further, the microcomputer 12051 can set beforehand an inter-vehicle distance to be maintained in front of the vehicle running in front of the vehicle 12100, and can perform automatic brake control (including follow-up stop control), automatic acceleration control (including follow-up start control), and the like. In this manner, it is possible to perform cooperative control to conduct automatic driving or the like to autonomously travel not depending on the operation of the driver.

For example, in accordance with the distance information obtained from the imaging units 12101 to 12104, the microcomputer 12051 can extract three-dimensional object data concerning three-dimensional objects under the categories of two-wheeled vehicles, regular vehicles, large vehicles, pedestrians, utility poles, and the like, and use the three-dimensional object data in automatically avoiding obstacles. For example, the microcomputer 12051 classifies the obstacles in the vicinity of the vehicle 12100 into obstacles visible to the driver of the vehicle 12100 and obstacles difficult for the driver to visually recognize. The microcomputer 12051 then determines collision risks indicating the risks of collision with the respective obstacles. If a collision risk is equal to or higher than a set value, and there is a possibility of collision, the microcomputer 12051 can output a warning to the driver via the audio speaker 12061 and the display unit 12062, or can perform driving support for avoiding collision by performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian exists in images captured by the imaging units 12101 to 12104. Such pedestrian recognition is carried out through a process of extracting feature points from the images captured by the imaging units 12101 to 12104 serving as infrared cameras, and a process of performing pattern matching on the series of feature points indicating the outlines of objects and determining whether or not there is a pedestrian, for example. If the microcomputer 12051 determines that a pedestrian exists in the images captured by the imaging units 12101 to 12104, and recognizes a pedestrian, the sound/image output unit 12052 controls the display unit 12062 to display a rectangular contour line for emphasizing the recognized pedestrian in a superimposed manner. Further, the sound/image output unit 12052 may also control the display unit 12062 to display an icon or the like indicating the pedestrian at a desired position.

An example of a vehicle control system to which the technology according to the present disclosure can be applied has been described above. The technology according to the present disclosure can be applied to the imaging units 12031 among the components described above, for example. Specifically, the imaging device 11 shown in FIG. 1 can be applied to the imaging units 12031. As the technology according to the present disclosure is applied to the imaging units 12031, it is possible to enhance the image quality of a reconstructed image.

Note that the present disclosure can also be embodied in the configurations described below.

<1> An imaging device manufacturing apparatus that manufactures an imaging device that includes:
  a mask that is formed with a light shielding material that blocks incident light, has a plurality of transmission regions that are formed in part of the light shielding material and transmit the incident light, and has a light condensing element that is disposed in the transmission regions and condenses the incident light, to modulate and transmit the incident light;
  an imaging element that images the incident light modulated by the mask as a pixel signal; and
  a reconstruction unit that reconstructs the pixel signal as a final image by signal processing,
  the imaging device manufacturing apparatus including
  an adjustment unit that adjusts the light condensing element, on the basis of an incident range of the incident light entering the imaging element after passing through the mask, and an incident range of the incident light entering the imaging element after passing through the light condensing element.

<2> The imaging device manufacturing apparatus according to <1>, in which
  the light condensing element is a lens, and
  the adjustment unit adjusts the lens, on the basis of an evaluation function formed with a relationship between a common range between the incident range of the incident light entering the imaging element after passing through the mask and the incident range of the incident light entering the imaging element after passing through the lens, and an optical axis direction of the lens.

<3> The imaging device manufacturing apparatus according to <2>, in which
  the evaluation function is formed with a difference between a central direction of the common range between the incident range of the incident light entering the imaging element after passing through the mask and the incident range of the incident light entering the imaging element after passing through the lens, and the optical axis direction of the lens.

<4> The imaging device manufacturing apparatus according to <3>, in which
  the adjustment unit adjusts the optical axis direction of the lens, to minimize the evaluation function.

<5> The imaging device manufacturing apparatus according to <4>, in which
  the adjustment unit adjusts the optical axis direction of the lens, and adjusts a diameter of the lens in accordance with a distance from a center position of the mask, to minimize the evaluation function.

<6> The imaging device manufacturing apparatus according to <1>, in which
  the light condensing element is a Fresnel zone plate (FZP), and
  the adjustment unit adjusts the FZP, on the basis of an evaluation function formed with a relationship between a common range between the incident range of the incident light entering the imaging element after passing through the mask and the incident range of the incident light entering the imaging element after passing through the FZP, and a focus direction in which focusing of the FZP can be achieved.

<7> The imaging device manufacturing apparatus according to <6>, in which
the evaluation function is formed with a difference between the central direction of the common range between the incident range of the incident light entering the imaging element after passing through the mask and the incident range of the incident light entering the imaging element after passing through the FZP, and the focus direction of the FZP.

<8> The imaging device manufacturing apparatus according to <7>, in which
the adjustment unit adjusts the focus direction of the FZP, to minimize the evaluation function.

<9> The imaging device manufacturing apparatus according to <8>, in which
the adjustment unit adjusts the focus direction of the FZP by adjusting a center position and an aspect ratio of the FZP, to minimize the evaluation function.

<10> The imaging device manufacturing apparatus according to <9>, in which
the adjustment unit adjusts the focus direction of the FZP by adjusting the number of rings of the FZP, to minimize the evaluation function.

<11> The imaging device manufacturing apparatus according to <1>, in which
the adjustment unit adjusts a layout of the light condensing elements, on the basis of a first evaluation function corresponding to common ranges between the incident range of the incident light entering the imaging element after passing through the mask and the incident ranges of the incident light entering the imaging element after passing through the light condensing elements.

<12> The imaging device manufacturing apparatus according to <11>, in which
the first evaluation function is a total sum of the common ranges with respect to the respective light condensing elements, and
the adjustment unit calculates the first evaluation function formed with the total sum of the common ranges, and adjusts the layout of the light condensing elements, to minimize the first evaluation function.

<13> The imaging device manufacturing apparatus according to <12>, further including
a layout moving unit that moves the layout of the light condensing elements on condition that the layout can be reconstructed as the final image by the reconstruction unit performing signal processing on the pixel signal,
in which the adjustment unit controls the layout moving unit to move the layout of the light condensing elements so that the light condensing elements are not disposed within a range of a predetermined distance from a center position of the mask, and repeatedly performs a process of calculating the first evaluation function formed with the total sum of the common ranges while changing the predetermined distance, to adjust the layout of the light condensing elements to minimize the first evaluation function.

<14> The imaging device manufacturing apparatus according to <13>, in which
the adjustment unit controls the layout moving unit to move the layout of the light condensing elements so that the light condensing elements are not disposed within the range of the predetermined distance from the center position of the mask, repeatedly performs the process of calculating the first evaluation function formed with the total sum of the common ranges while widening the predetermined distance, and sets the layout of the light condensing elements immediately before the first evaluation function starts increasing as the layout of the light condensing elements with which the first evaluation function is minimized.

<15> The imaging device manufacturing apparatus according to <14>, in which
the adjustment unit adjusts the light condensing elements on the basis of a second evaluation function formed with a relationship between the common ranges and a focus direction in which focusing of the light condensing elements is achieved.

<16> The imaging device manufacturing apparatus according to <15>, in which
the second evaluation function is formed with a difference between a central direction of the common ranges and the focus direction of the light condensing elements.

<17> The imaging device manufacturing apparatus according to <16>, in which
the adjustment unit adjusts the focus direction of the light condensing elements, to minimize the second evaluation function.

<18> The imaging device manufacturing apparatus according to any one of <11> to <17>, in which
the adjustment unit adjusts the layout of the light condensing elements to a uniformly redundant array (URA) pattern.

<19> A method for manufacturing an imaging device that includes:
a mask that is formed with a light shielding material that blocks incident light, has a plurality of transmission regions that are formed in part of the light shielding material and transmit the incident light, and has a light condensing element that is disposed in the transmission regions and condenses the incident light, to modulate and transmit the incident light;
an imaging element that images the incident light modulated by the mask as a pixel signal; and
a reconstruction unit that reconstructs the pixel signal as a final image by signal processing,
the method including
the step of adjusting the light condensing element, on the basis of an incident range of the incident light entering the imaging element after passing through the mask, and an incident range of the incident light entering the imaging element after passing through the light condensing element.

<20> An imaging device including:
a mask that is formed with a light shielding material that blocks incident light, has a plurality of transmission regions that are formed in part of the light shielding material and transmit the incident light, and has a light condensing element that is disposed in the transmission regions and condenses the incident light, to modulate and transmit the incident light;
an imaging element that images the incident light modulated by the mask as a pixel signal; and
a reconstruction unit that reconstructs the pixel signal as a final image by signal processing,
in which the light condensing element is adjusted on the basis of an incident range of the incident light entering the imaging element after passing through the mask, and an incident range of the incident light entering the imaging element after passing through the light condensing element.

REFERENCE SIGNS LIST

11 Imaging device
31, 31', 31", 31''' Mask
32 Imaging element
33 Reconstruction unit
34 Output unit
41, 41-1 to 41-4, 41-11 to 41-15, 41-21 to 41-25 Transmission region
42 Non-transmission region
51, 51-1 to 51-4, 51-11 to 51-15, 51'-11 to 51'-15, 51-21 to 51-25, 51'-21 to 51'-25 Lens
101 Manufacturing apparatus
111 Mask generation unit
112 Assembly unit
121 Lens array adjustment unit
122 Lens attachment unit
131 ILFOV calculation unit
132 CFOV calculation unit
133 LFOV calculation unit
134 LFOV center calculation unit
135 Lens optical axis adjustment unit
141, 141-1 to 141-9, 141'-1 to 141'-9 Transmission region
142, 142' Non-transmission region
151-1 to 151-9, 151'-1 to 151'-9 FZP
201 Manufacturing apparatus
211 Mask generation unit
212 Assembly unit
221 Lens array adjustment unit
222 Lens attachment unit
230 Initial lens layout memory unit
231 ILFOV calculation unit
232 CFOV calculation unit
233 LFOV calculation unit
234 LFOV sum calculation unit
235 LFOV sum comparison unit
236 LFOV center calculation unit
237 Lens optical axis adjustment unit
238 Lens layout memory unit
239 Optimum lens layout memory unit
240 LFOV sum minimum value memory unit
241 Lens layout moving unit

The invention claimed is:

1. An imaging device manufacturing apparatus that manufactures an imaging device that includes:
a mask that is formed with a light shielding material that blocks incident light, has a plurality of transmission regions that are formed in part of the light shielding material and transmit the incident light, and has a light condensing element that is disposed in the transmission regions and condenses the incident light, to modulate and transmit the incident light;
an imaging element that images the incident light modulated by the mask as a pixel signal; and
a reconstruction unit that reconstructs the pixel signal as a final image by signal processing,
the imaging device manufacturing apparatus comprising an adjustment unit that adjusts the light condensing element, on a basis of an incident range of the incident light entering the imaging element after passing through the mask, and an incident range of the incident light entering the imaging element after passing through the light condensing element.

2. The imaging device manufacturing apparatus according to claim 1, wherein
the light condensing element is a lens, and
the adjustment unit adjusts the lens, on a basis of an evaluation function formed with a relationship between a common range between the incident range of the incident light entering the imaging element after passing through the mask and the incident range of the incident light entering the imaging element after passing through the lens, and an optical axis direction of the lens.

3. The imaging device manufacturing apparatus according to claim 2, wherein
the evaluation function is formed with a difference between a central direction of the common range between the incident range of the incident light entering the imaging element after passing through the mask and the incident range of the incident light entering the imaging element after passing through the lens, and the optical axis direction of the lens.

4. The imaging device manufacturing apparatus according to claim 3, wherein
the adjustment unit adjusts the optical axis direction of the lens, to minimize the evaluation function.

5. The imaging device manufacturing apparatus according to claim 4, wherein
the adjustment unit adjusts the optical axis direction of the lens, and adjusts a diameter of the lens in accordance with a distance from a center position of the mask, to minimize the evaluation function.

6. The imaging device manufacturing apparatus according to claim 1, wherein
the light condensing element is a Fresnel zone plate (FZP), and
the adjustment unit adjusts the FZP, on a basis of an evaluation function formed with a relationship between a common range between the incident range of the incident light entering the imaging element after passing through the mask and the incident range of the incident light entering the imaging element after passing through the FZP, and a focus direction in which focusing of the FZP can be achieved.

7. The imaging device manufacturing apparatus according to claim 6, wherein
the evaluation function is formed with a difference between a central direction of the common range between the incident range of the incident light entering the imaging element after passing through the mask and the incident range of the incident light entering the imaging element after passing through the FZP, and the focus direction of the FZP.

8. The imaging device manufacturing apparatus according to claim 7, wherein
the adjustment unit adjusts the focus direction of the FZP, to minimize the evaluation function.

9. The imaging device manufacturing apparatus according to claim 8, wherein
the adjustment unit adjusts the focus direction of the FZP by adjusting a center position and an aspect ratio of the FZP, to minimize the evaluation function.

10. The imaging device manufacturing apparatus according to claim 9, wherein
the adjustment unit adjusts the focus direction of the FZP by adjusting the number of rings of the FZP, to minimize the evaluation function.

11. The imaging device manufacturing apparatus according to claim 1, wherein
the adjustment unit adjusts a layout of the light condensing elements, on a basis of a first evaluation function corresponding to common ranges between the incident range of the incident light entering the imaging element after passing through the mask and the incident ranges of the incident light entering the imaging element after passing through the light condensing elements.

12. The imaging device manufacturing apparatus according to claim 11, wherein
the first evaluation function is a total sum of the common ranges with respect to the respective light condensing elements, and
the adjustment unit calculates the first evaluation function formed with the total sum of the common ranges, and adjusts the layout of the light condensing elements, to minimize the first evaluation function.

13. The imaging device manufacturing apparatus according to claim 12, further comprising
a layout moving unit that moves the layout of the light condensing elements on condition that the layout can be reconstructed as the final image by the reconstruction unit performing signal processing on the pixel signal,
wherein the adjustment unit controls the layout moving unit to move the layout of the light condensing elements so that the light condensing elements are not disposed within a range of a predetermined distance from a center position of the mask, and repeatedly performs a process of calculating the first evaluation function formed with the total sum of the common ranges while changing the predetermined distance, to adjust the layout of the light condensing elements to minimize the first evaluation function.

14. The imaging device manufacturing apparatus according to claim 13, wherein
the adjustment unit controls the layout moving unit to move the layout of the light condensing elements so that the light condensing elements are not disposed within the range of the predetermined distance from the center position of the mask, repeatedly performs the process of calculating the first evaluation function formed with the total sum of the common ranges while widening the predetermined distance, and sets the layout of the light condensing elements immediately before the first evaluation function starts increasing as the layout of the light condensing elements with which the first evaluation function is minimized.

15. The imaging device manufacturing apparatus according to claim 14, wherein
the adjustment unit adjusts the light condensing elements on a basis of a second evaluation function formed with a relationship between the common ranges and a focus direction in which focusing of the light condensing elements is achieved.

16. The imaging device manufacturing apparatus according to claim 15, wherein
the second evaluation function is formed with a difference between a central direction of the common ranges and the focus direction of the light condensing elements.

17. The imaging device manufacturing apparatus according to claim 16, wherein
the adjustment unit adjusts the focus direction of the light condensing elements, to minimize the second evaluation function.

18. The imaging device manufacturing apparatus according to claim 11, wherein
the adjustment unit adjusts the layout of the light condensing elements to a uniformly redundant array (URA) pattern.

19. A method for manufacturing an imaging device that includes:
a mask that is formed with a light shielding material that blocks incident light, has a plurality of transmission regions that are formed in part of the light shielding material and transmit the incident light, and has a light condensing element that is disposed in the transmission regions and condenses the incident light, to modulate and transmit the incident light;
an imaging element that images the incident light modulated by the mask as a pixel signal; and
a reconstruction unit that reconstructs the pixel signal as a final image by signal processing,
the method comprising
the step of adjusting the light condensing element, on a basis of an incident range of the incident light entering the imaging element after passing through the mask, and an incident range of the incident light entering the imaging element after passing through the light condensing element.

20. An imaging device comprising:
a mask that is formed with a light shielding material that blocks incident light, has a plurality of transmission regions that are formed in part of the light shielding material and transmit the incident light, and has a light condensing element that is disposed in the transmission regions and condenses the incident light, to modulate and transmit the incident light;
an imaging element that images the incident light modulated by the mask as a pixel signal; and
a reconstruction unit that reconstructs the pixel signal as a final image by signal processing,
wherein the light condensing element is adjusted on a basis of an incident range of the incident light entering the imaging element after passing through the mask, and an incident range of the incident light entering the imaging element after passing through the light condensing element.

* * * * *